US009665202B2

(12) United States Patent
Cheng et al.

(10) Patent No.: US 9,665,202 B2
(45) Date of Patent: May 30, 2017

(54) TOUCH PANEL CIRCUIT AND OPERATION METHOD THEREOF

(71) Applicants: CHUNGHWA PICTURE TUBES, LTD., Taoyuan (TW); TATUNG UNIVERSITY, Taipei (TW)

(72) Inventors: Fu-Chiung Cheng, Taipei (TW); Hsin-Chi Lai, New Taipei (TW); Pin-Hung Chou, Taipei (TW)

(73) Assignees: CHUNGHWA PICTURE TUBES, LTD., Taoyuan (TW); TATUNG UNIVERSITY, Taipei (TW)

( * ) Notice: Subject to any disclaimer, the term of this patent is extended or adjusted under 35 U.S.C. 154(b) by 384 days.

(21) Appl. No.: 14/265,378

(22) Filed: Apr. 30, 2014

(65) Prior Publication Data
US 2015/0193063 A1 Jul. 9, 2015

(30) Foreign Application Priority Data

Jan. 8, 2014 (TW) .............................. 103100690 A

(51) Int. Cl.
*G06F 3/041* (2006.01)
(52) U.S. Cl.
CPC .................. *G06F 3/0416* (2013.01)
(58) Field of Classification Search
CPC ... G09G 2310/0267; G09G 2310/0283; G09G 3/3266; G06F 3/038; G06F 3/0416; H03K 5/026; H03K 21/02
See application file for complete search history.

(56) References Cited

U.S. PATENT DOCUMENTS

2009/0284398 A1* 11/2009 Shen ..................... G06F 3/0414
341/33
2012/0038566 A1 2/2012 Lin
2013/0134995 A1 5/2013 Moon et al.

FOREIGN PATENT DOCUMENTS

| JP | 2012221494 A | 11/2012 |
| TW | 200631316 A | 9/2006 |
| TW | 200945156 A1 | 11/2009 |
| TW | 201020879 A1 | 6/2010 |
| TW | I394069 B | 4/2013 |

\* cited by examiner

*Primary Examiner* — Amare Mengistu
*Assistant Examiner* — Shawna Stepp Jones
(74) *Attorney, Agent, or Firm* — CKC & Partners Co., Ltd.

(57) ABSTRACT

A touch panel circuit and an operation method thereof are disclosed herein. The touch panel circuit includes first scan lines, second scan lines, and a first scan sensing module. The first scan sensing module includes first scan-sensing units corresponding to the first scan lines, respectively. Each first scan sensing unit includes a first logic gate and a second logic gate. The first logic gate includes a first input terminal, a first output terminal, and a first control terminal. The second logic gate includes a second input terminal, a second output terminal, and a second control terminal. The first logic gate and second logic gate enable the first input terminal to connect to the first output terminal and one of the first scan lines, or enable the second input terminal and one of the first scan lines to connect to the second output terminal.

15 Claims, 19 Drawing Sheets

TOUCH PANEL CIRCUIT AND OPERATION METHOD THEREOF

RELATED APPLICATIONS

This application claims priority to Taiwanese Application Serial Number 103100690 filed Jan. 8, 2014, which is herein incorporated by reference.

BACKGROUND

Field of Invention

The present application relates to a touch panel circuit and an operation method thereof. More particularly, the present application relates to a touch panel circuit having a logic gate circuit and an operation method thereof.

Description of Related Art

Due to significant emergence of touch-sensing related technologies in recent years, various touch-sensing technologies have been utilized in numerous electronic products such as the touch panels.

Despite the vast variety of touch panels and products of relative technologies currently on the market, issues still exist, such as high modular cost, low resolution, lack of multi-touch support, touch panel being unbendable and poor scalability for large display panels, etc.

Therefore, an important area of research requiring improvement relates to provide a touch panel circuit and an operation method thereof, so as to efficiently detect a touch input and determine a coordinate of the touch input on the touch panel.

SUMMARY

The present invention provides a touch panel circuit. The touch panel circuit includes several first scan lines, several second scan lines and a first scan sensing module. The first scan lines perpendicularly intersect with the second scan lines respectively. The first scan sensing module includes several first scan sensing units, each of the first scan sensing units correspond to one of the first scan lines. Each of the first scan sensing units includes a first logic gate and a second logic gate. The first logic gate includes a first input terminal, a first output terminal and a first control terminal. The first output terminal is coupled to one of the first scan lines. The second logic gate includes a second input terminal, a second output terminal and a second control terminal. The second input terminal is coupled to one of the first scan lines. Either the first logic gate or the second logic gate is turned on according to a first control signal, so the first input terminal is connected to the first output terminal and one of the first scan lines, or the second input terminal and one of the first scan lines are connected to the second output terminal.

An aspect of the present invention provides an operation method of a touch panel circuit. The touch panel circuit includes several first scan lines, several second scan lines, a first scan sensing module, a second scan sensing module, a first buffer module, a second buffer module and a touch determining unit. The operation method includes: the first scan sensing module providing several first voltage reference signals; the second scan sensing module sensing voltage levels of the second scan lines; the second buffer module temporarily storing voltage levels of the second scan lines, when one of the second scan lines is of the first voltage reference signal; the second scan sensing module providing several second voltage reference signals; the first scan sensing module sensing voltage levels of the first scan lines; the first buffer module temporarily storing the voltage levels of the first scan lines, when one of the first scan lines is of the second voltage reference signal; and the touch determining unit determining a touch input incident according to the voltage levels of the first scan lines temporarily stored and the voltage levels of the second scan lines temporarily stored.

An aspect of the present invention provides an operation method of a touch panel circuit. The touch panel circuit includes several first scan lines, several second scan lines, a first scan sensing module, a second scan sensing module, a first buffer module, a second buffer module and a touch determining unit. The operation method includes: the first scan sensing module providing several first voltage reference signals; the second scan sensing module sensing voltage levels of the second scan lines; the second buffer module temporarily storing a voltage level of one of the second scan lines, when the one of the second scan lines is of the first voltage reference signal; the second scan sensing module providing the voltage level temporarily stored to the one of the second scan lines, the first scan sensing module sensing a voltage level of one of the first scan lines, and the first buffer module temporarily storing the voltage level of the one of the first scan lines; the touch determining unit determining a first touch coordinate, according to the voltage level of the one of the second scan lines temporarily stored and the voltage level of the one of the first scan lines temporarily stored; and the touch determining unit storing the first touch coordinate.

In summary, the touch panel circuit and the operation method thereof of the present invention utilizes combinations of basic logic gates and relative circuit designs to control the touch panel in a fully digitalized manner, without requiring extra circuits to convert analog signals to digital signals. Hence the overall cost can be lowered and sensing operation can be performed quicker. Further, the touch panel circuit and the operation method thereof of the present invention can support multi-touch input, and can be applied to flexible touch panels or large-size touch panels. The touch panel circuit and the operation method thereof of the present invention can quickly determine an occurrence of a touch input incident and can accurately determine the touch coordinate of the touch input incident, via circuit designs of the logic gates.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

Figure 1A:
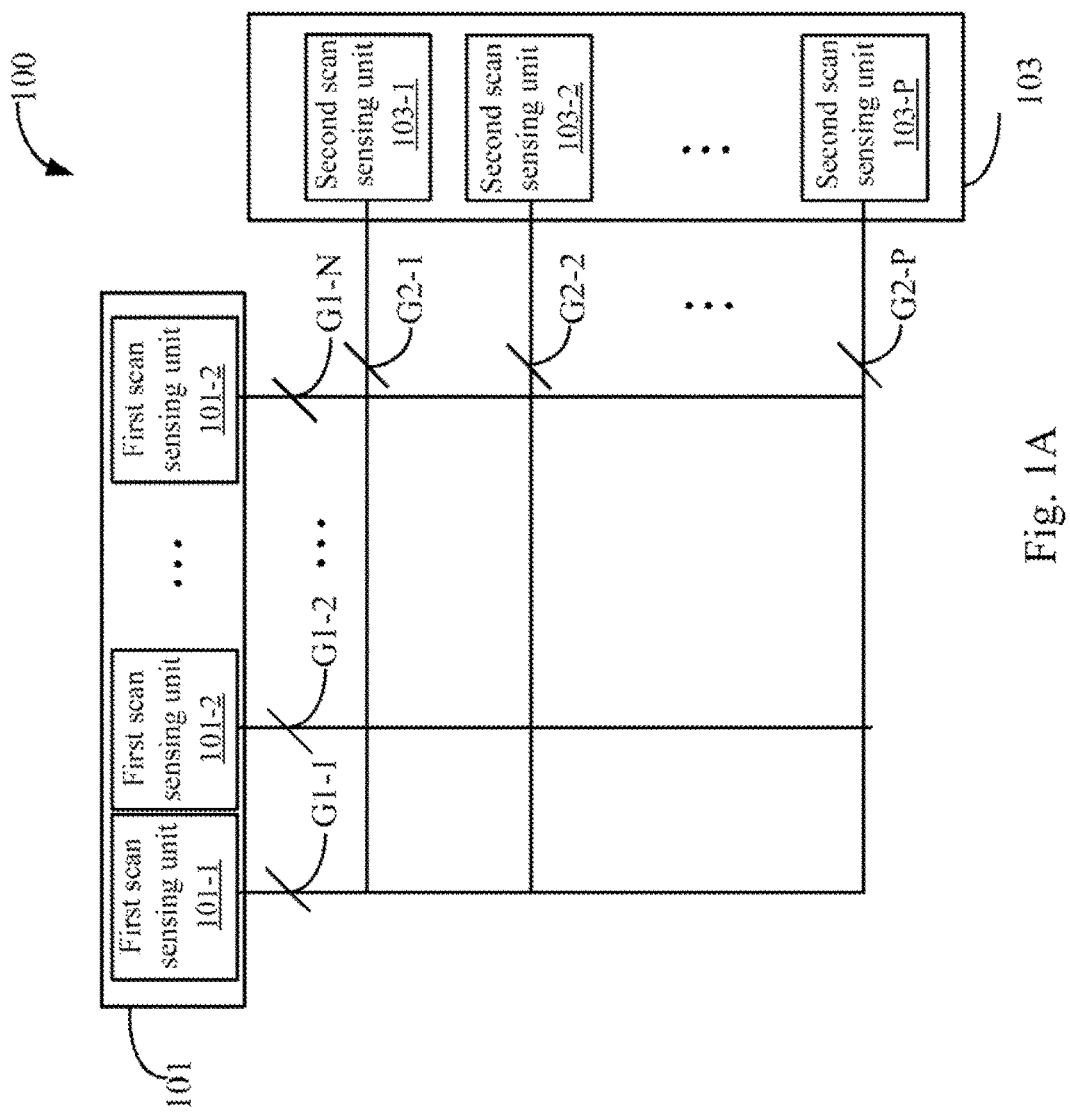
FIG. 1A~FIG. 1B are diagrams illustrating a touch panel circuit according to an embodiment of the present invention.

Reference is now made to FIG. 1A. FIG. 1A is a diagram illustrating a touch panel circuit 100 according to an embodiment of the present invention.

In an embodiment, the touch panel circuit 100 includes several first scan lines G1-1~G1-N, several second scan lines G2-1~G2-P, a first scan sensing module 101 and a second scan sensing module 103. The first scan lines G1-1~G1-N perpendicularly intersect the second scan lines G2-1~G2-P respectively, and N and P are integers larger than 1. For instance, the first scan lines G1-1~G1-N can be several vertical scan lines and the second scan lines G2-1~G2-P can be several horizontal scan lines.

As shown in FIG. 1A, the first scan sensing module 101 includes several first scan sensing units 101-1~101-N. The first scan sensing units 101-1~101-N correspond to the first scan lines G1-1~G1-N respectively. The second sensing module 103 includes several second scan sensing units 103-1~103-P. The second scan sensing units 103-1~103-P correspond to the second scan lines G2-1~G2-P respectively.

Figure 1B:
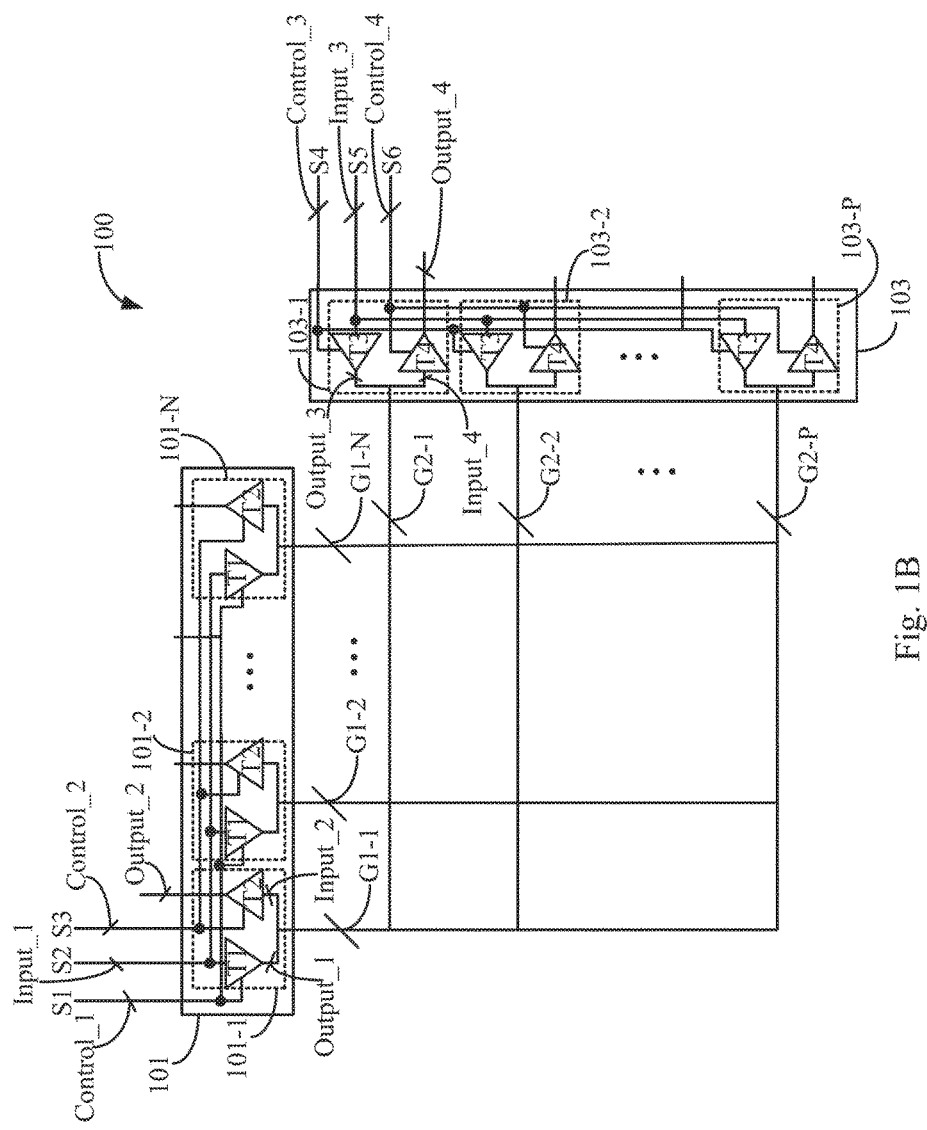

In an embodiment shown in FIG. 1B, each of the first scan sensing units 101-1~101-N includes a first logic gate T1 and a second logic gate T2. The first logic gate T1 includes a first input terminal Input_1, a first output terminal Output_1 and a first control terminal Control_1. The first output terminal Output_1 of the first logic gate T1 is coupled to one of the first scan lines G1-1~G1-N. The second logic gate T2 includes a second input terminal Input_2, a second output terminal Output_2 and a second control terminal Control_2. The second input terminal Input_2 of the second logic gate T2 is coupled to one of the first scan lines G1-1~G1-N. In other words, the first output terminal Output_1 of the first logic late T1 is coupled to the second input terminal Input_2 of the second logic gate T2.

Further, either the first logic gates T1 or the second logic gates T2 of the first scan sensing units 101-1~101-N are turned on at a time, according to control signals S1 and S3 respectively.

For instance, for the first scan sensing units 101-1~101-N, the first logic gates T1 are turned on according to the control signal S1 and the second logic gates T2 are turned off according to the control signal S3, so the first input terminal Input_1 of the first logic gates T1 of the first scan sensing units 101-1~101-N is connected to the first output terminals Output_1 of the first logic gates T1 and one of the first scan lines G1-1~G1-N. Alternatively, the second logic gates T2 of the first scan sensing units 101-1~101-N are turned on according to the control signal S3 and the first logic gates T1 are turned off according to the control signal S1, so the second input terminals Input_2 of the second logic gates T2 of the first scan sensing units 101-1~101-N and one of the first scan lines G-1~G1-N are connected to the second output terminals Output_2 of the second logic gates T2.

In other words, a bidirectional input/output (I/O) circuit can be formed by corresponding the first logic gates T1 and the second logic gates T2 to the respective first scan lines G1-1~G1-N. When the first logic gates T1 are turned on, the signal can be transmitted from the first input terminal Input_1 of each first logic gate T1 to each of the first scan lines G1-1~G1-N. When the second logic gates T2 are turned on, the signal can be transmitted from each of the first scan lines G-1~G1-N to the second output terminal Output_2 of each second logic gate T2.

Figure 1C:
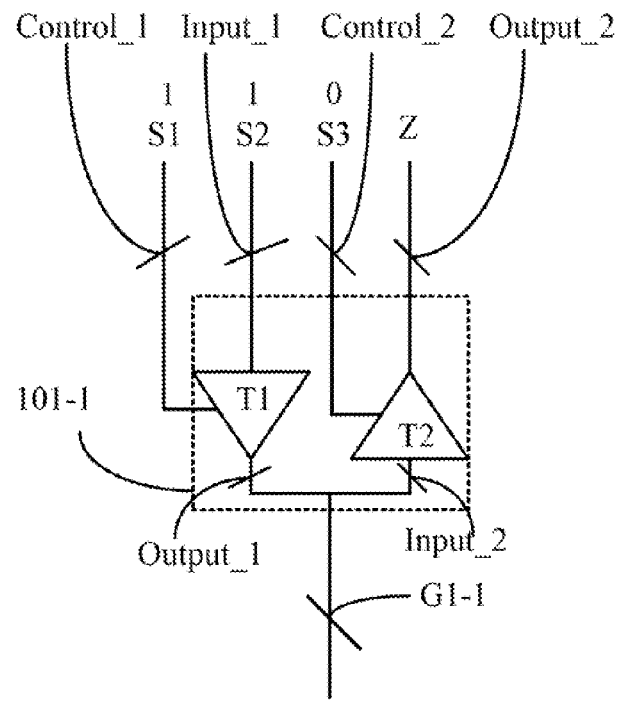
FIG. 1C~FIG. 1D are diagrams illustrating a logic gate circuit according to FIG. 1B.

In an embodiment, the first logic gate T1 and the second logic gate T2 can be a tri-state logic gate respectively. For instance, reference is now made to FIG. 1C and the first sensing unit 101-1 is used as an example. When a high voltage level (High=1) is input to the first control terminal Control_1 of the first logic gate T1, the first logic gate T1 is turned on, and the first output terminal Output_1 of the first logic gate T1 is controlled according to the first input terminal Input_1. The first input terminal Input_1 receives the control signal S2 of a high voltage level (High=1) and accordingly the first output terminal Ouput_1 is of the high voltage level (High=1). At the same time, when the second control terminal Control_2 of the second logic gate T2 receives the control signal S3 of a low voltage level (Low=0), the second logic gate T2 is turned off, so the second output terminal Output_2 of the second logic gate T2 has a high impedance (Z) and is therefore not affected by the second input terminal Input_2.

Figure 1D:
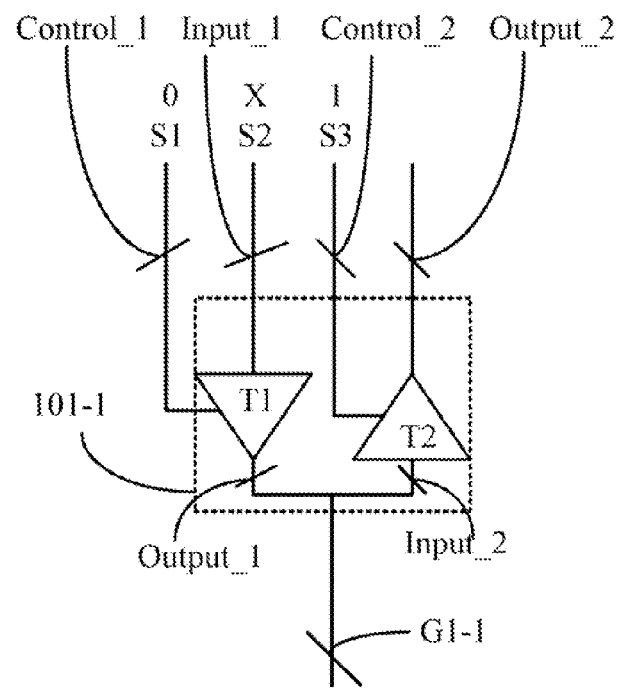

Reference is now made to FIG. 1D and the first sensing unit 101-1 is used as an example. When a low voltage level (Low=0) is input to the first control terminal Control_1 of the first logic gate T1, the first logic gate T1 is turned off, so the first output terminal Output_1 of the first logic gate T1 is not controlled by the first input terminal Input_1. At the same time, the second control terminal Control_2 of the second logic gate T2 receives the control signal S3 of a high voltage level (High=1), so the second logic gate T2 is turned on. The second output terminal Output_2 of the second logic gate T2 is then affected according to the second input terminal Input_2, and receives the voltage level of the first scan line G1-1.

Similarly, as shown in FIG. 1B, each of the second scan sensing units 103-1~103-P includes a third logic gate T3 and a fourth logic gate T4. The third logic gate T3 includes a third input terminal Input_3, a third output terminal Output_3 and a third control terminal Control_3. The third output terminal Output_3 of the third logic gate T3 is coupled to one of the second scan lines G2-1~G2-P. The fourth logic gate T4 includes a fourth input terminal Input_4, a fourth output terminal Output_4 and a fourth control terminal Control_4. The fourth input terminal Input_4 of the fourth logic gate T4 is coupled to one of the second scan lines G2-1~G2-N.

Further, either the third logic gates T3 or the fourth logic gates T4 of the second scan sensing units 103-1~103-P are turned on at a time, according to control signals S4 and S6 respectively.

For instance, for the second scan sensing units 103-1~103-P, the third logic gates T3 are turned on according to the control signal S4 and the fourth logic gates T4 are turned off according to the control signal S6, so the third input terminal Input_3 of the third logic gates T3 of the second scan sensing units 103-1~103-P is connected to the third output terminals Output_3 of the third logic gates T3 and one of the second scan lines G2-1~G2-P. Alternatively, for the second scan sensing units 103-1~103-P, the fourth logic gates T4 are turned on according to the control signal S6 and the third logic gates T3 are turned off according to the control signal S4, so the fourth input terminals Input_4 of the fourth logic gates T4 of the second scan sensing units 103-1~103-P and one of the second scan lines G2-1~G2-P are connected to the fourth output terminals Output_4 of the fourth logic gates T4.

In other words, a bidirectional input/output (I/O) circuit can be formed by corresponding the third logic gates T3 and the fourth logic gates T4 to the respective second scan lines G2-1~G2-P. When the third logic gates T3 are turned on, the signal can be transmitted from the third input terminal Input_3 of each third logic gate T3 to each of the second scan lines G2-1~G2-P respectively. When the fourth logic gates T4 are turned on, the signal can be transmitted from each of the second scan lines G2-1~G2-P to the fourth output terminal Output_4 of each fourth logic gate T4 respectively.

In present embodiment, the third logic gate T3 and the fourth logic gate T4 can be a tri-state logic gate respectively, and operation methods thereof are similar to those of the first logic gate T1 and the second logic gate T2 (as described in embodiments shown in FIG. 1C and FIG. 1D), so relative details are omitted hereinafter.

In an embodiment as shown in FIG. 1B, the first logic gates T1 of the first scan sensing units 101-1~101-N and the fourth logic gates T4 of the second scan sensing units 103-1~103-P are turned on simultaneously according to the control signals S1 and S6 respectively. The second logic gates T2 of the first scan sensing units 101-1~101-N and the third logic gates T3 of the second scan sensing units 103-1~103-P are turned off simultaneously according to the control signals S3 and S4 respectively.

Therefore, when the first logic gates T1 of the first scan sensing units 101-1~101-N are turned on according to the control signal S1 and the fourth logic gates T4 of the second scan sensing units 103-1~103-P are simultaneously turned on according to the control signal S6, the first output terminals Output_1 of the first logic gates T1 provide several first voltage reference signals to the first scan lines G1-1~G1-N respectively, and voltage levels of the second scan lines G2-1~G2-P can be sensed by the fourth logic gates T4. When one of the first scan lines G1-1~G1-N and one of the second scan lines G2-1~G2-P are being touched by an external force, the one of the first scan lines G1-1~G-N is coupled to the one of the second scan lines G2-1~G2-P, so the first voltage reference signal of the one of the first scan lines G1-1~G1-N is transmitted to the one of the second scan lines G2-1~G2-P and then received by the fourth input terminal Input_4 of a corresponding fourth logic gate T4.

In an embodiment, the first logic gates T1 of the first scan sensing units 101-1~101-N and the fourth logic gates T4 of the second scan sensing units 103-1~103-P are turned off simultaneously according to the control signals S1 and S6 respectively. The second logic gates T2 of the first scan sensing units 101-1~101-N and the third logic gates T3 of the second scan sensing units 103-1~103-P are turned off simultaneously time according to the control signals S3 and S4 respectively.

Therefore, when the second logic gates T2 of the first scan sensing units 101-1~101-N are turned on according to the control signal S3 and the third logic gates T3 of the second scan sensing units 103-1~103-P are simultaneously turned on according to the control signal S4, the third output terminals Output_3 of the third logic gates T3 provide several second voltage reference signals to the second scan lines G2-1~G2-P respectively, and voltage levels of the second scan lines G2-1~G2-P can be sensed by the fourth logic gates T4 respectively. When one of the first scan lines G1-1~G1-N and one of the second scan lines G2-1~G2-P are being touched by an external force, the one of the first scan lines G1-1~G1-N is coupled to the one of the second scan lines G2-1~G2-P, so a second voltage reference signal of the one of the second scan lines G2-1~G2-P can be transmitted to the one of the first scan lines G1-1~G1-N and is received by the second input terminal Input_2 of a corresponding second logic gate T2.

Figure 1E:
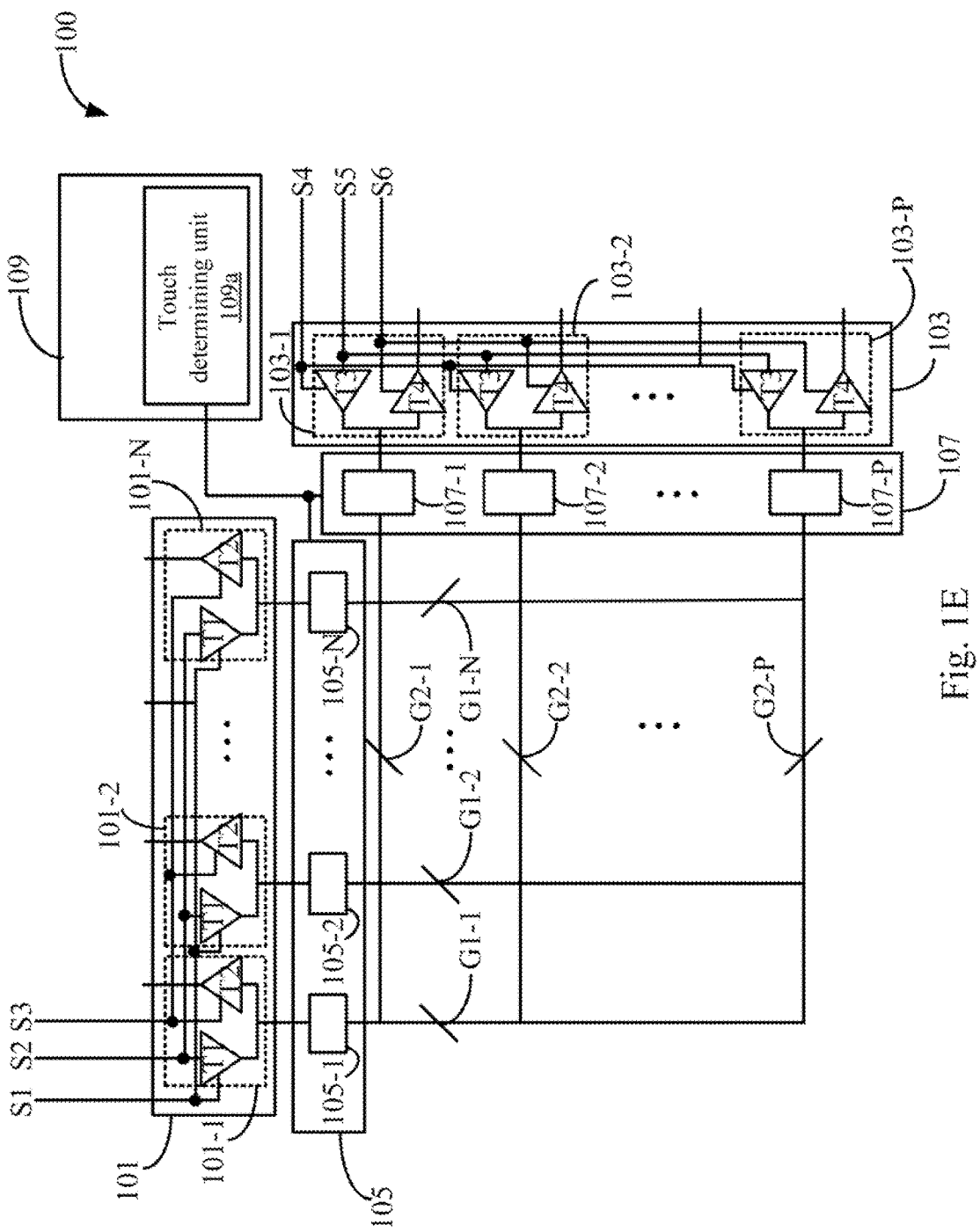
FIG. 1E~FIG. 1F are diagrams illustrating a touch panel circuit according to an embodiment of the present invention.

In an embodiment shown in FIG. 1E, the touch panel circuit 100 can further comprise a control module 109, a first buffer module 105 and a second buffer module 107. The control module 109 includes a touch determining unit 109a. The first buffer module 105 includes several first buffer units 105-1~105-N, and the second buffer module 107 includes several second buffer units 107-1~107-P. The first buffer units 105-1~105-N are coupled to the second input terminals Input_2 of the second logic gates T2 and the touch determining unit 109a respectively. The second buffer units 107-1~107-P are coupled to the fourth input terminals Input_4 of the fourth logic gates T4 and the touch determining unit 109a respectively.

Further, the touch determining unit 109a is coupled to the second input terminals Input_2 of the second logic gates T2 and the fourth input terminals Input_4 of the fourth logic gates T4 via the first buffer module 105 and the second buffer module 107 respectively.

As shown in FIG. 1E, the first buffer units 105-1~105-N of the first buffer module 105 temporarily store voltage levels of the first scan lines G1-1~G1-N respectively. The second buffer units 107-1~107-P of the second buffer module 107 temporarily store voltage levels of the second scan lines G2-1~G2-P respectively. The touch determining unit 109a then determines an touch input incident according to the temporarily stored voltage levels of the first scan lines G1-1~G1-N and the temporarily stored voltage levels of the second scan lines G2-1~G2-P. Such touch input incident includes one or several touch coordinates.

When one of the first scan lines G1-1~G1-N is coupled to one of the second scan lines G2-1~G2-P, a touch input incident mentioned above occurs. The second buffer units 107-1~107-P temporarily store the first voltage reference signals being transmitted from the first scan lines G1-1~G1-N to the respective second scan lines G2-1~G2-P respectively. Next, the first buffer units 105-1~105-N temporarily store the second voltage reference signals being transmitted from the second scan lines G2-1~G2PN to the respective first scan lines G1-1~G1-N respectively. The touch determining unit 109a then determines the touch coordinate of the touch input incident according to the voltage levels of the first scan lines G1-1~G1-N temporarily stored in the respective first buffer units 105-1~105-N and the voltage levels of the second scan lines G2-1~G2-P temporarily stored in the respective second buffer units 107-1~107-P.

Figure 1F:
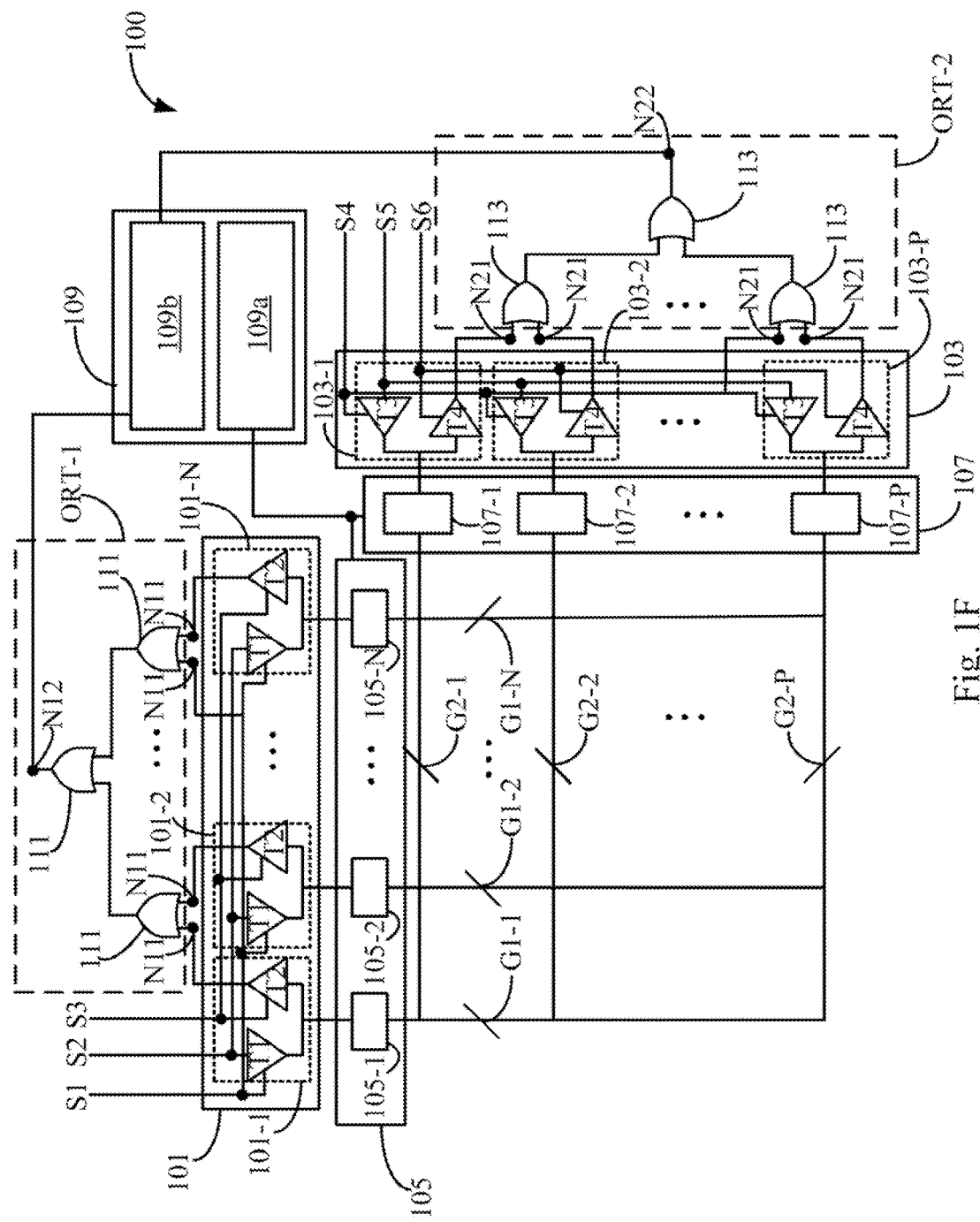

In an embodiment shown in FIG. 1F, the touch panel circuit 100 can further includes several first OR gates 111 and several second OR gates 113.

For instance, the first OR gates 111 form a first OR-gate binary tree ORT-1 according to a binary tree structure. The first OR-gate binary tree ORT-1 includes several first input nodes N11 and a first output node N12. The first input nodes N11 correspond to the second output terminals Output_2 of the second logic gates T2 respectively.

On the other hand, the second OR gates 113 form a second OR-gate binary tree ORT-2 according to a binary tree structure. The second OR-gate binary tree ORT-2 includes several second input nodes N21 and a second output node N22. The second input nodes N21 correspond to the fourth output terminals Output_4 of the fourth logic gates T4 respectively.

As shown in FIG. 1F, the control module 109 further includes a touch detecting unit 109b. The touch detecting unit 109b is coupled to the first output node N12 of the first OR-gate binary tree ORT-1 and the second output node N22 of the second OR-gate binary tree ORT-2. The touch detecting unit 109b can determine an occurrence of the above mentioned touch input incident according to the first output node N12 of the first OR-gate binary tree ORT-1 or the second output node N22 of the second OR-gate binary tree ORT-2.

For instance, when the first scan lines G1-1~G1-N are coupled to the second scan lines G2-1~G2-P, at least one of the second logic gates T2 of the first scan sensing units 101-1~101-N transmits a high voltage level to the first OR-gate binary tree ORT-1, or at least one of the fourth logic gates T4 of the second scan sensing units 103-1~103-P transmits a high voltage level to the second OR-gate binary tree ORT-2. According to how an OR gate operates, when one of several input terminals is of a high voltage level (High=1), the output terminal is also of the high voltage level (High=1). Therefore, the touch detecting unit 109b can determine whether the first scan lines G1-1~G1-N have coupled to the second scan lines G2-1~G2-P, i.e., determine whether the above mentioned touch input incident is occurred, according to the first output node N12 of the first OR-gate binary tree ORT-1 or the second output node N22 of the second OR-gate binary tree ORT-2.

In an embodiment, the touch panel circuit 100 can further include several pull-down resistors (not illustrated), wherein several the pull-down resistors are respectively coupled between the first scan lines G1-1~G1-N and the ground, and several the pull-down resistors are respectively coupled between the second scan lines G2-1~G2-P and the ground. When the first scan lines G1-1~G1-N are not coupled to the second scan lines G2-1~G2-P, a low voltage level (Low=0) is detected by the control module 109. Resistances of the pull-down resistors are preferably between 4700 (4.7 k) ohms~100000 (100 k) ohms.

Figure 2A:
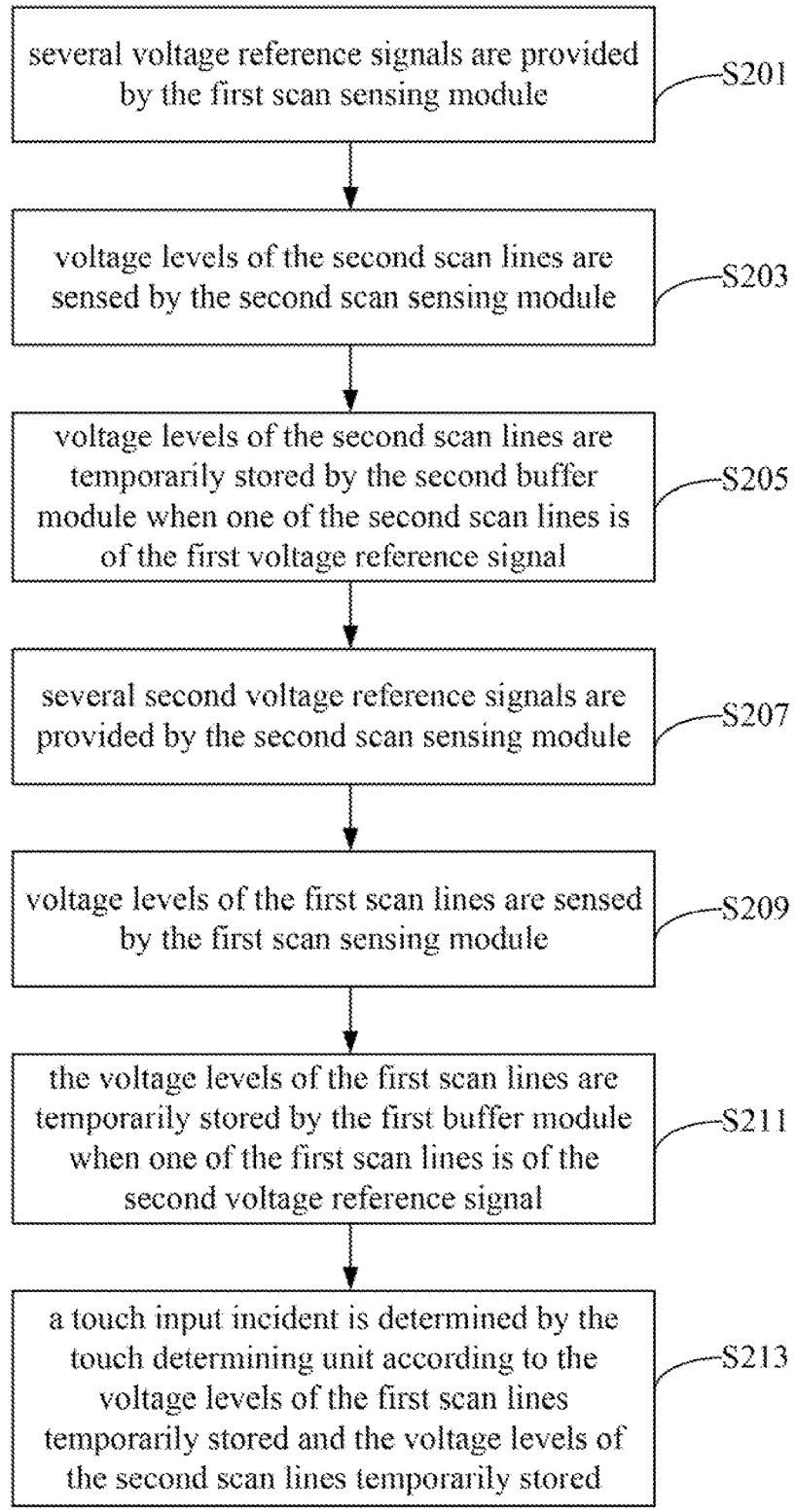
FIG. 2A is a flow chart illustrating an operation method of a touch panel circuit according to an embodiment of the present invention.

Reference is now made to FIG. 2A. FIG. 2A is a flow chart illustrating an operation method 200 of the touch panel circuit according to an embodiment of the present invention. Prior executing the operation method 200, the touch panel circuit 100 can be initialized and voltage levels of the first scan lines G1-1~G1-N and the second scan lines G2-1~G2-P are reset.

Figure 2B:
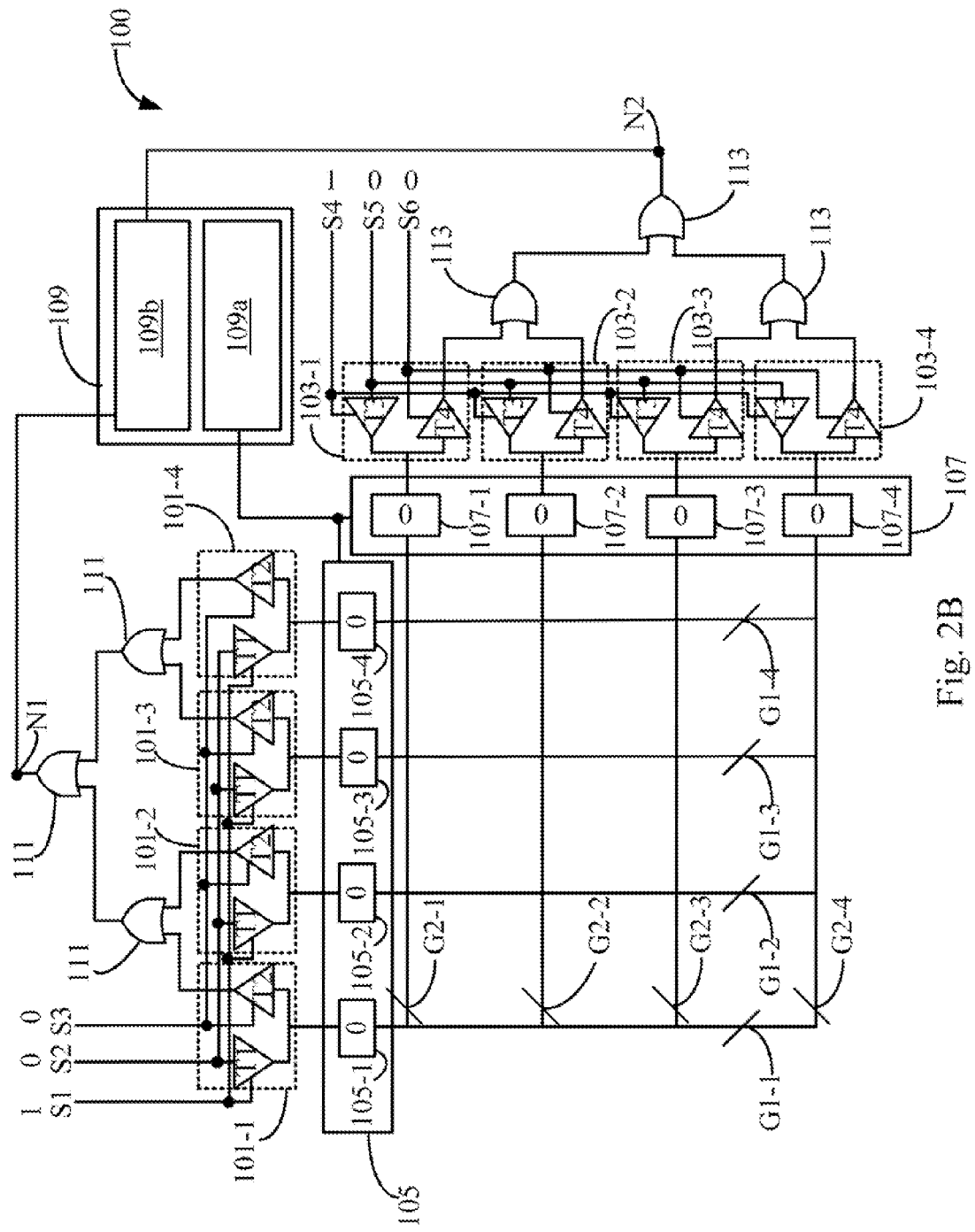
FIG. 2B~2F are diagrams illustrating operations of a touch panel circuit according to an embodiment of the present invention.

Reference is now made to FIG. 2B~2F. FIG. 2B~2F are diagrams illustrating operations of the touch panel circuit 100 according to an embodiment of the present invention. For illustration purposes, the following embodiment is exemplified using N is 4 and P is 4, but is not limited thereto. As shown in FIG. 2B, the control signals S1 and S4 are both of a high voltage level (High=1) and the control signals S2~S3 and S5~S6 are all of a low voltage level (Low=0), so voltage levels of the first scan lines G1-1~G1-N and the second scan lines G2-1~G2-P are all of the low voltage level (Low=0) and accordingly the voltage levels of the first scan lines G-1~G1-4 and the second scan lines G2-1~G2-4 are reset. Under such circumstance, the first buffer units 105-1~105-4 of the first buffer module 105 temporarily store the low voltage levels of the first scan lines G1-1~G1-4 respectively, and the second buffer units 107-1~107-4 of the second buffer module 107 temporarily store the low voltage levels (Low=0) of the second scan lines G2-1~G2-4 respectively. More specifically, the control signals S1~S6 all being of the low voltage level (Low=0) are only for exemplary purposes, and are not meant to limit the scope of the present invention. Any techniques that can reset the voltage levels of the first scan lines and the second scan lines are within the scope of the present invention.

Firstly, step S201 is performed: several voltage reference signals are provided by the first scan sensing module.

Figure 2C:
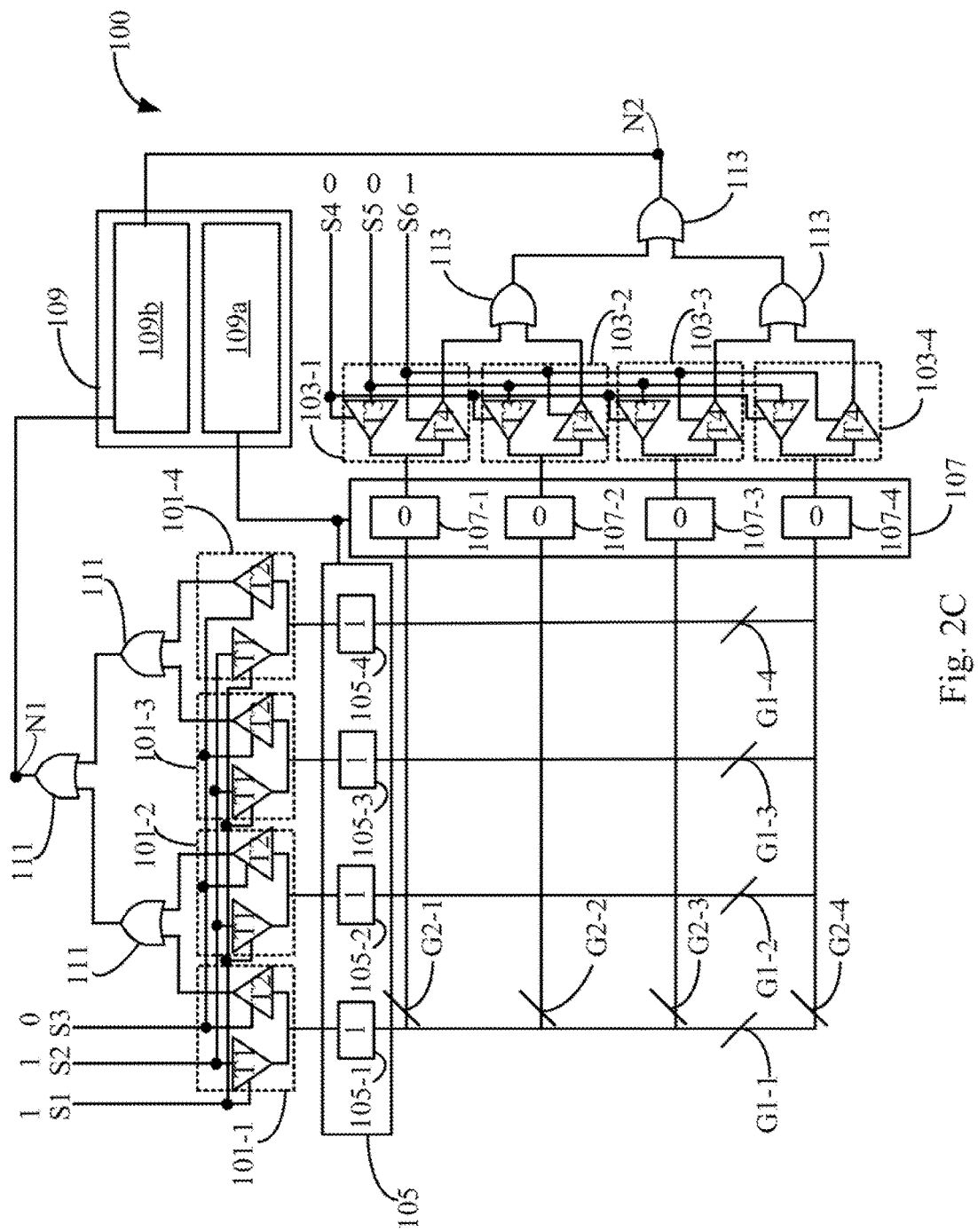

For instance, as shown in FIG. 2C, the control signals S1~S3 are of the high voltage level (High=1), the high voltage level (High=1) and the low voltage level (Low=0) respectively, and the first logic gates T1 are turned on according to the control signal S1. The first logic gates T1 provide the first voltage reference signals to the first scan lines G1-1~G1-4 respectively according to the control signal S2.

Subsequently, step S203 is performed: voltage levels of the second scan lines are sensed by the second scan sensing module.

For instance, as shown in FIG. 2C, the control signals S4-S6 are of the low voltage level (Low=0), the low voltage level (Low=0) and the high voltage level (High=1) respectively, so the fourth logic gates T4 are turned on according to the control signal S4. The touch determining unit 109a senses voltage levels of the second scan lines G2-1~G2-4 via the fourth logic gates T4.

More specifically, the control signals S1~S3 and the control signals S4~S6 can be generated according to the control module 109, and are transmitted to the first scan sensing module 101 and the second scan sensing module 103 respectively from the control module 109. The control signals S1~S3 and the control signals S4~S6 are however not limited to be generated according to the control module 109. Any devices capable of generating the control signal are within the scope of the present invention.

Subsequently, step S205 is performed: voltage levels of the second scan lines are temporarily stored by the second buffer module when one of the second scan lines is of the first voltage reference signal.

Figure 2D:
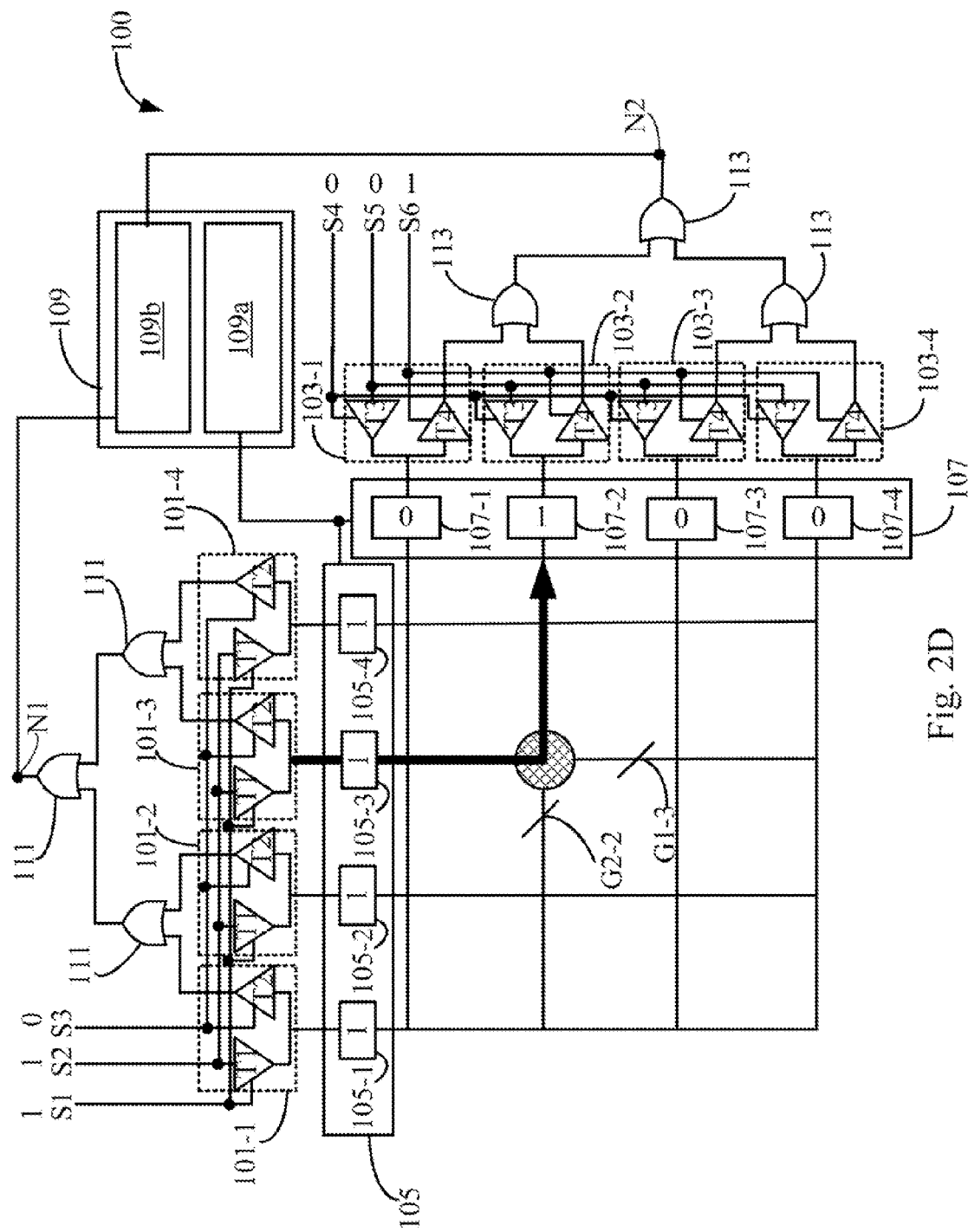

For instance, as shown in FIG. 2D, an external force (e.g. pressing) is applied when one of the first scan lines G1-3 is coupled to one of the second scan line G2-2. Under such circumstance, the first voltage reference signal of the first scan line G1-3 is transmitted to the second scan line G2-2. At the same time, the second buffer module 107 temporarily stores voltage levels of the second scan lines G2-1~G2-4, meaning the second buffer units 107-1~107-4 of the second buffer module 107 temporarily store the low voltage level (Low=0), the high voltage level (High=1), the low voltage level (Low=0) and the low voltage level (Low=0) respectively. More specifically, in the present embodiment, the touch determining unit 109a senses the second scan lines G2-1~G2-4 via the second scan sensing module 103. When the touch determining unit 109a has sensed one of the second scan lines G2-1~G2-4 is of the high voltage level (High=1), the second buffer units 107-1~107-4 temporarily store voltages levels of the second scan lines G2-1~G2-4 respectively.

Subsequently, step S207 is performed: several second voltage reference signals are provided by the second scan sensing module.

Figure 2E:
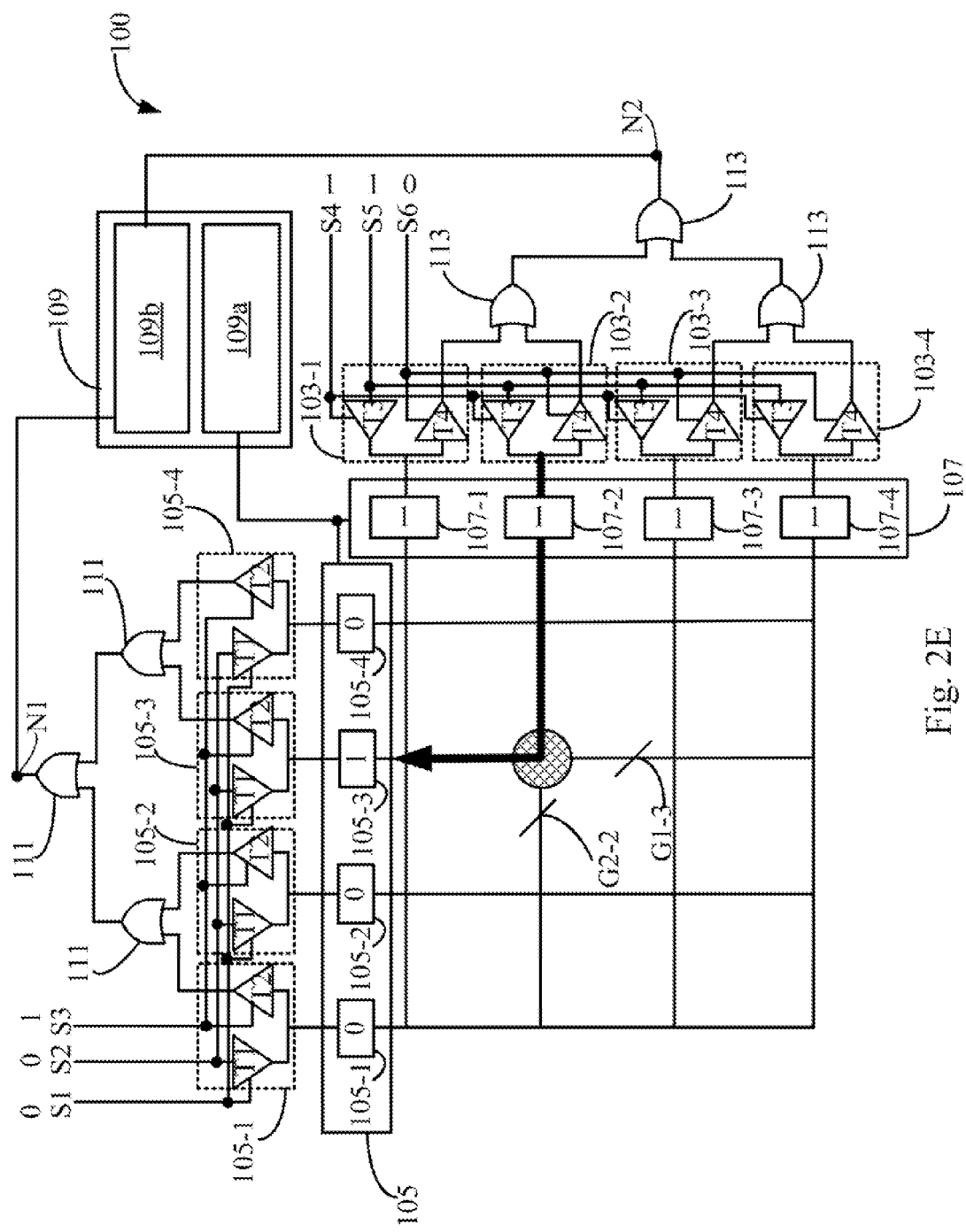

For instance, as shown in FIG. 2E, the control signals S4~S6 are of the high voltage level (High=1), the high voltage level (High=1) and the low voltage level (Low=0) respectively, and the third logic gates T3 are turned on according to the control signal S4. The third logic gates T3 provide several second voltage reference signals to the second scan lines G2-1~G2-4 respectively according to the control signal S5.

Step S209 is then performed: voltage levels of the first scan lines are sensed by the first scan sensing module.

For instance, as shown in FIG. 2E, the control signals S1~S3 are of the low voltage level (Low=0), the low voltage level (Low=0) and the high voltage level (High=1) respectively, so the second logic gates T2 are turned on and the touch determining unit 109a senses voltage levels of the first scan lines G1-1~G1-4 via the second logic gates T2. More specifically, the specified voltage levels of the above control signals S1~S6 are merely examples and are not limited thereto.

Step S211 is then performed: the voltage levels of the first scan lines are temporarily stored by the first buffer module when one of the first scan lines is of the second voltage reference signal.

For instance, as shown in FIG. 2E, the first scan lines G1-3 is coupled to the second scan line G2-2, indicating an external pressing has occurred. Under such circumstance, the second voltage reference signal of the second scan line G2-2 is transmitted to the first scan line G1-3. At the same moment, the first buffer module 105 temporarily stores voltage levels of the first scan lines G1-1~G1-4, meaning the first buffer units 105-1~105-4 of the first buffer module 105 store the low voltage level (Low=0), the high voltage level (High=1), the low voltage level (Low=0) and the low voltage level (Low=0) respectively. More specifically, the touch determining unit 109a senses the first scan lines G1-1~G1-4 via the first scan sensing module 101. When the touch determining unit 109a has sensed one of the first scan lines G1-1~G1-4 is of the high voltage level (High=1), the first buffer units 105-1~105-4 temporarily store voltages levels of the first scan lines G1-1~G1-4 respectively.

Lastly, step S213 is performed: a touch input incident is determined by the touch determining unit according to the voltage levels of the first scan lines temporarily stored and the voltage levels of the second scan lines temporarily stored.

Figure 2F:
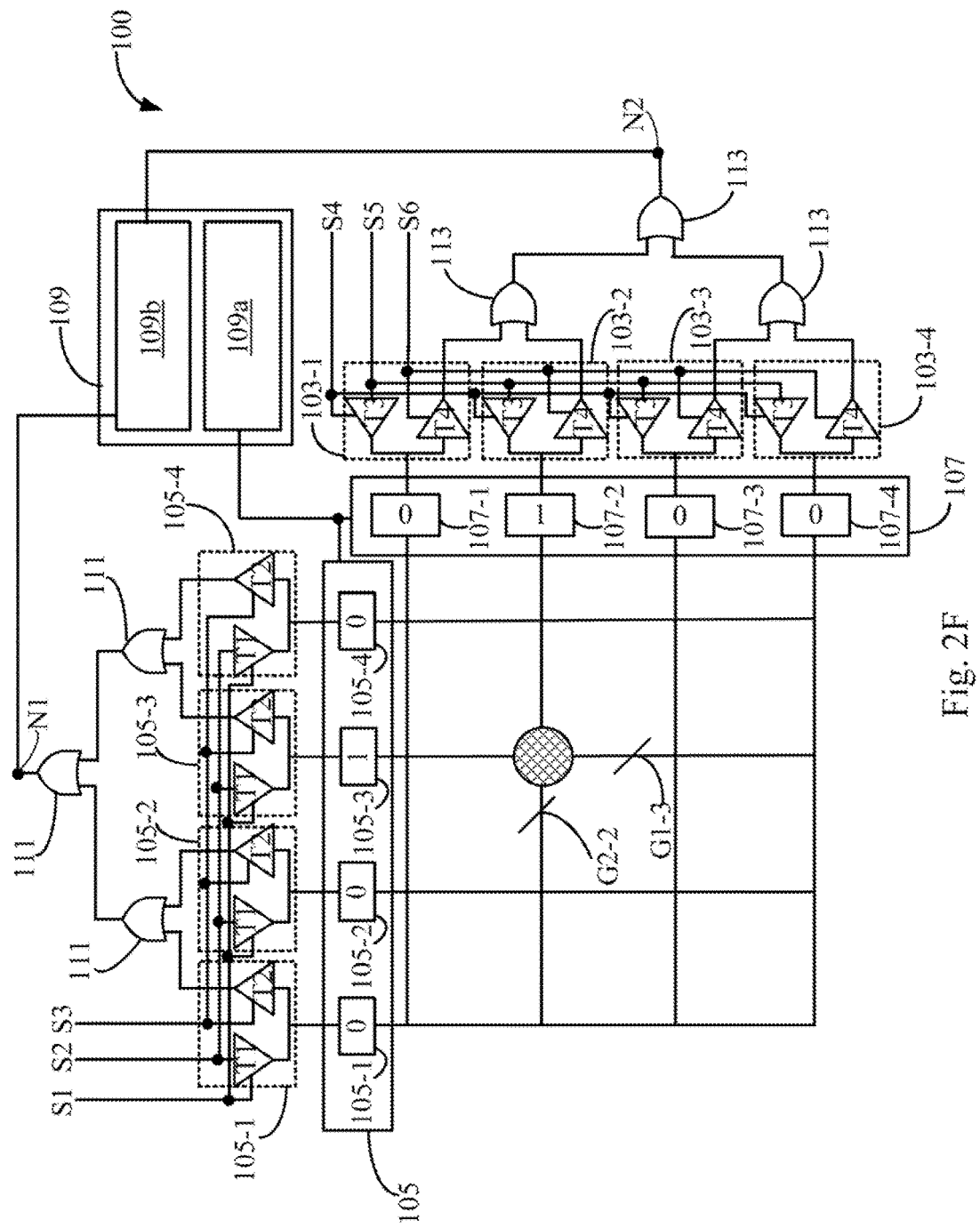

For instance, as shown in FIG. 2F, the first buffer units 105-1~105-4 temporarily store the low voltage level (Low=0), the high voltage level (High=1), the low voltage level (Low=0) and the low voltage level (Low=0) respectively, and the second buffer units 107-1~107-4 temporarily store the low voltage level (Low=0), the high voltage level (High=1), the low voltage level (Low=0) and the low voltage level (Low=0) respectively. The touch determining unit 109a determines the touch coordinate of a touch input incident according to the voltage levels of the first scan lines G1-1~G1-4 temporarily stored in the respective first buffer units 105-1~105-4, and the voltage levels of the second scan lines G2-1~G2-4 temporarily stored in the respective second buffer units 107-1~107-4.

In an embodiment, the operation method 200 can further include the following step: the touch detecting unit determining an occurrence of a touch event according to a first output node or a second output node.

For instance, as shown in FIG. 2F, when the first scan line G1-3 is coupled to the second scan line G2-2, the second logic gate T2 of the first scan sensing unit 101-3 transmits the high voltage level (High=1) to one of the first input nodes N11 of the first OR-gate binary tree ORT-1, or the fourth logic gate T4 of the second scan sensing unit 103-2 transmits the high voltage level (High=1) to one of the second input nodes N21 of the second OR-gate binary tree ORT-2. Hence, the first output node N21 of the first OR-gate binary tree ORT-1 is of the high voltage level (High=1). The touch detecting unit 109b determines a touch input incident has occurred to the touch panel circuit 100 according to the high voltage level (High=1) of the first output node N12. Alternatively, the second output node N22 of the second OR-gate binary tree ORT-2 is of the high voltage level (High=1), and the touch detecting unit 109b determines a touch input incident has occurred to the touch panel circuit 100 according to the high voltage level (High=1) of the second output node N22.

Figure 3A:
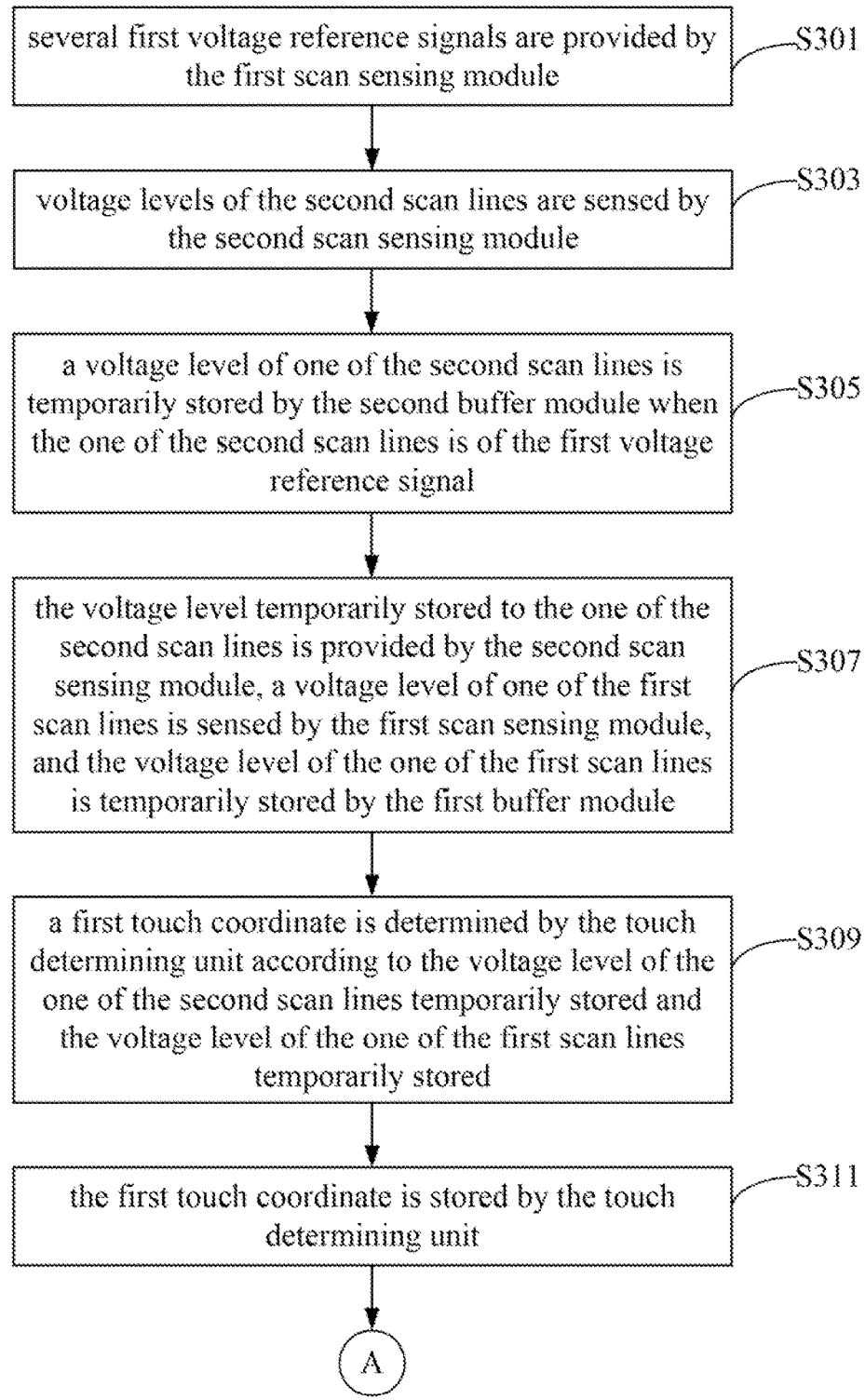
FIG. 3A and FIG. 3B are flow charts illustrating an operation method of a touch panel circuit according to an embodiment of the present invention.
Figure 3B:
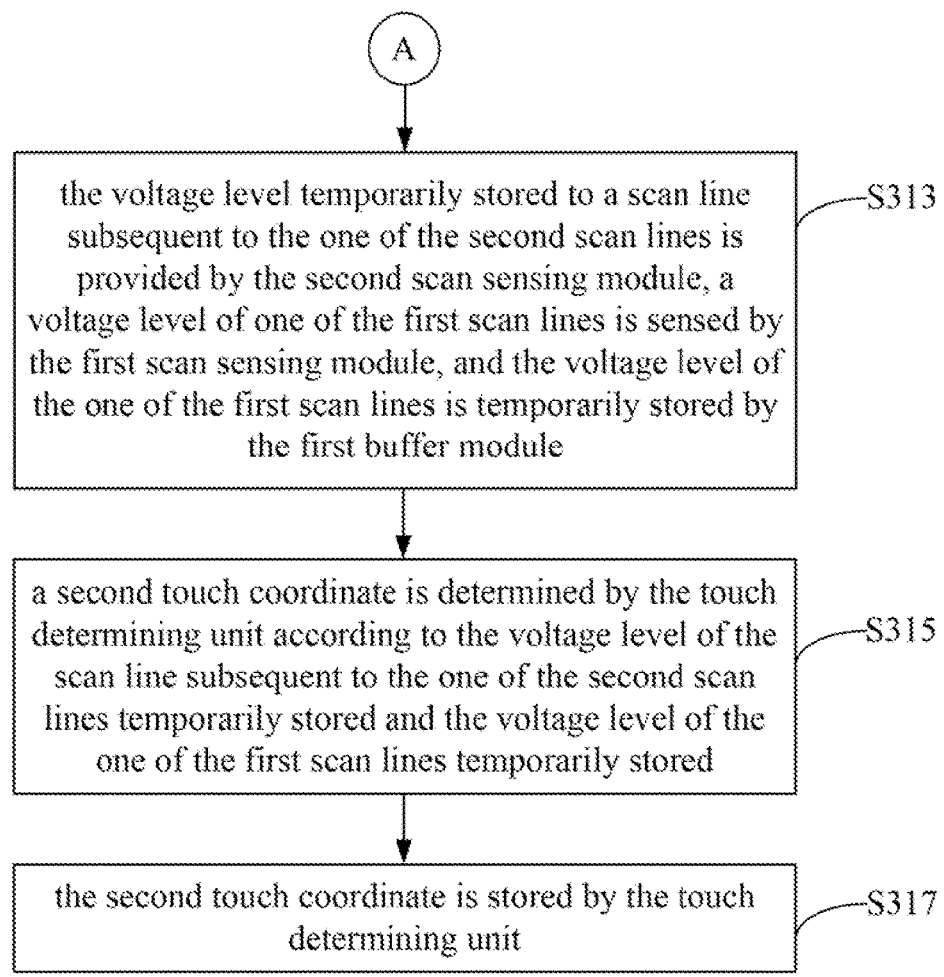

Reference is now made to FIG. 3A and FIG. 3B. FIG. 3A and FIG. 3B are flow charts illustrating an operation method 300 of the touch panel circuit according to an embodiment of the present invention.

Reference is now made to FIG. 3C~FIG. 3H. FIG. 3C~FIG. 3H are diagrams illustrating operations of the touch panel circuit 100 according to an embodiment of the present invention.

For illustration purposes, the following embodiment is exemplified using N is 4 and P is 4, but N and P are not limited thereto.

Figure 3C:
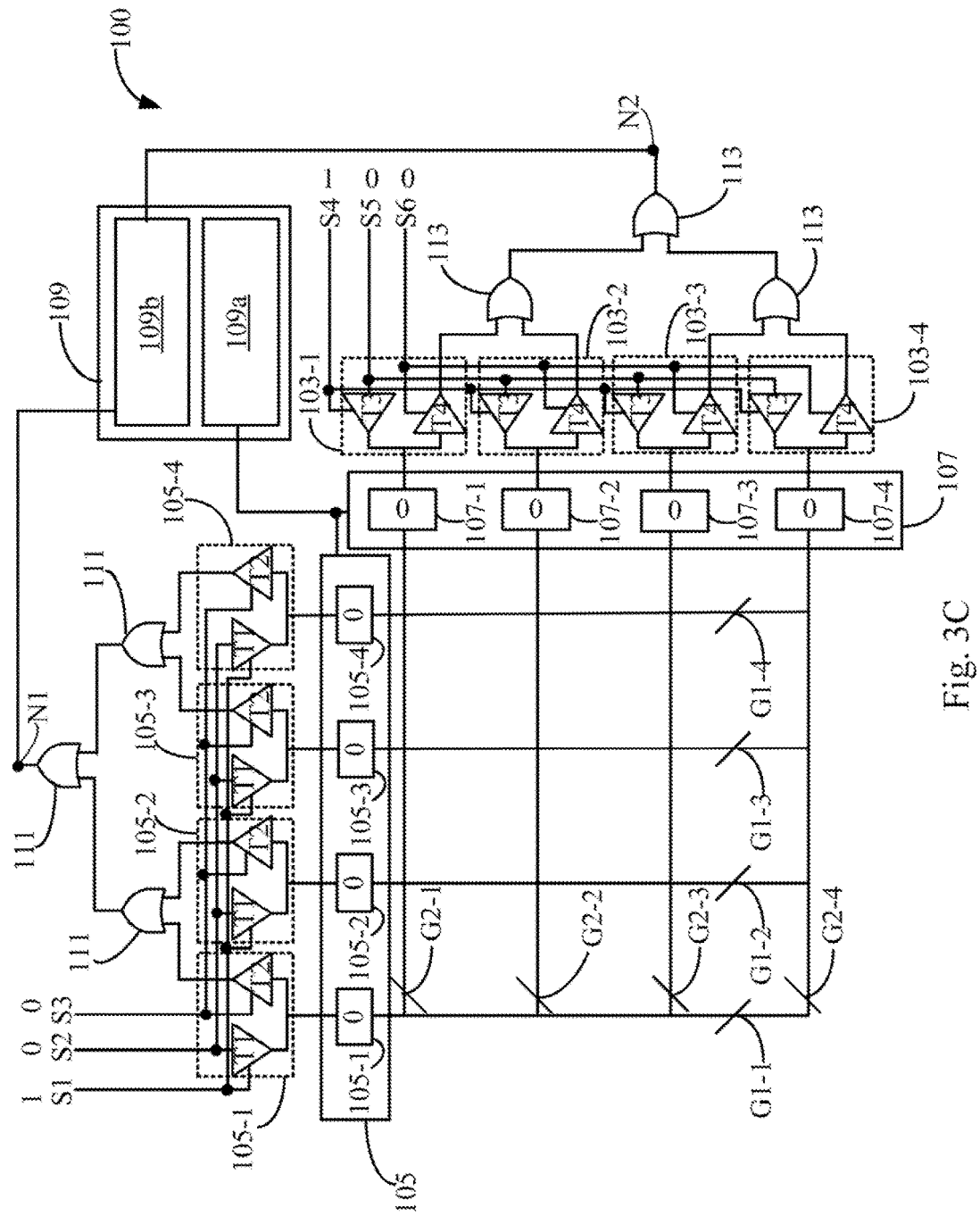
FIG. 3C~FIG. 3H are diagrams illustrating operations of a touch panel circuit according to an embodiment of the present invention.

As shown in FIG. 3C, prior executing the operation method 300, the touch panel circuit 100 can be initialized first and voltage levels of the first scan lines G-1~G1-4 and the second scan lines G2-1~G2-4 are reset.

Firstly, step S301 is performed: several first voltage reference signals are provided by the first scan sensing module.

Figure 3D:
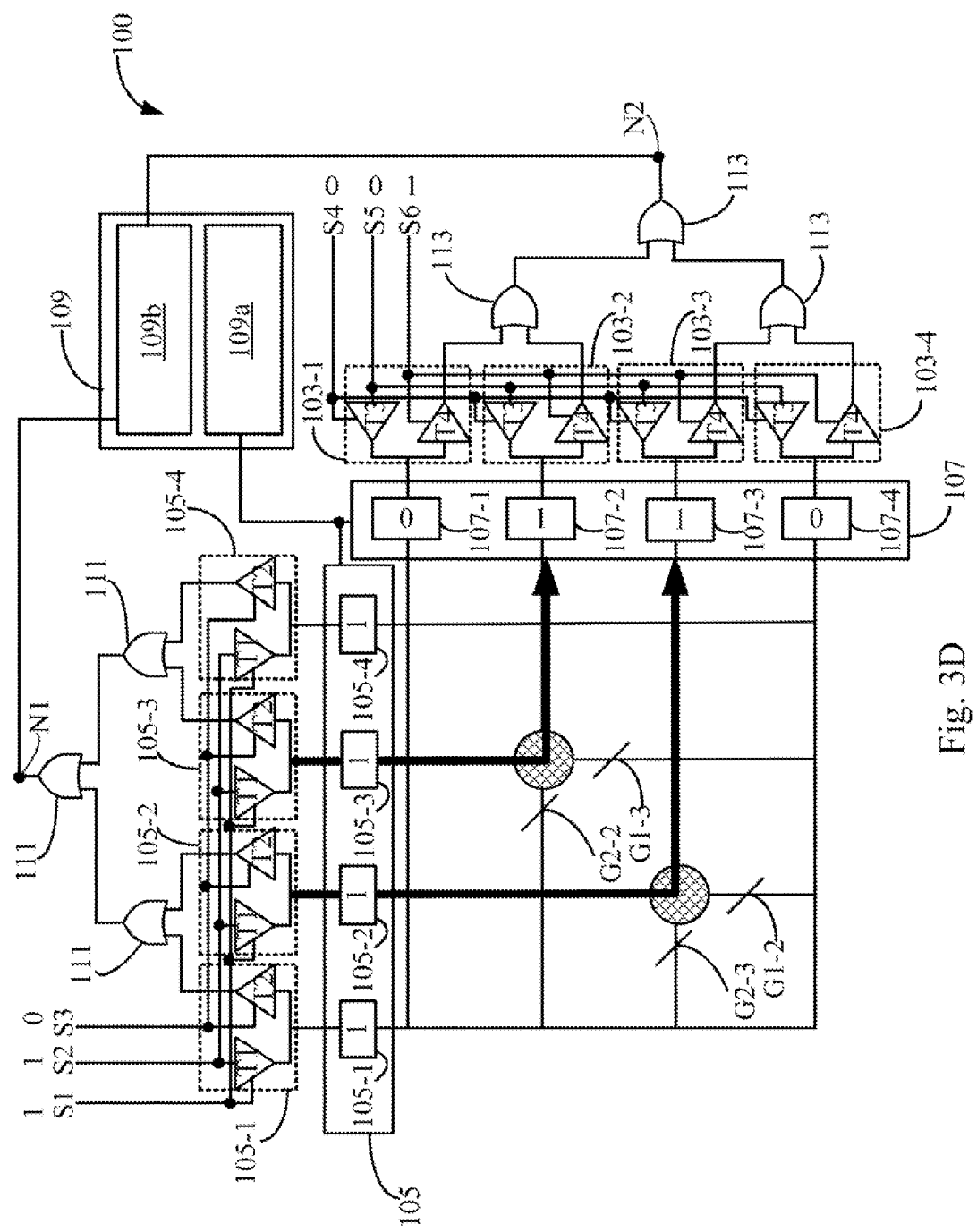

For instance, the control signals S1~S3 are of a high voltage level (High=1), a high voltage level (High=1) and a low voltage level (Low=0) respectively. The first logic gates T1 are turned on according to the control signal S1. The first logic gates T1 provide the first voltage reference signals to the first scan lines G1-1~G1-4 according to the control signal S2 respectively. As shown in FIG. 3D, a touch input incident includes 2 touch coordinates. In other words, a first touch coordinate corresponds to the first scan line G1-3 coupling to the second scan line G2-2, and a second touch coordinate corresponds to the first scan line G1-2 coupling to the second scan line G2-3.

Subsequently, step S303 is performed: voltage levels of the second scan lines are sensed by the second scan sensing module.

For instance, as shown in FIG. 3D, the touch determining unit 109a senses voltage levels of the second scan lines G2-1~G2-4 via the second scan sensing module 103. Since the first scan line G1-3 is coupled to the second scan line G2-2, and the first scan line G1-2 is coupled to the second scan line G2-3, the touch determining unit 109a senses the first voltage reference signal of the second scan line G2-2 and the first voltage reference signal of the second scan line G2-3.

Subsequently, step S305 is performed: a voltage level of one of the second scan lines is temporarily stored by the second buffer module when the one of the second scan lines is of the first voltage reference signal.

For instance, as shown in FIG. 3D, when the touch determining unit 109a has sensed the second scan line G2-2 or the second scan line G2-3 is of the first voltage reference signal, the second buffer units 107-2 and 107-3 store voltage levels of the second scan lines G2-2 and G2-3 respectively.

Subsequently, step S307 is performed: the voltage level temporarily stored to the one of the second scan lines is provided by the second scan sensing module, a voltage level of one of the first scan lines is sensed by the first scan sensing module, and the voltage level of the one of the first scan lines is temporarily stored by the first buffer module.

Figure 3E:
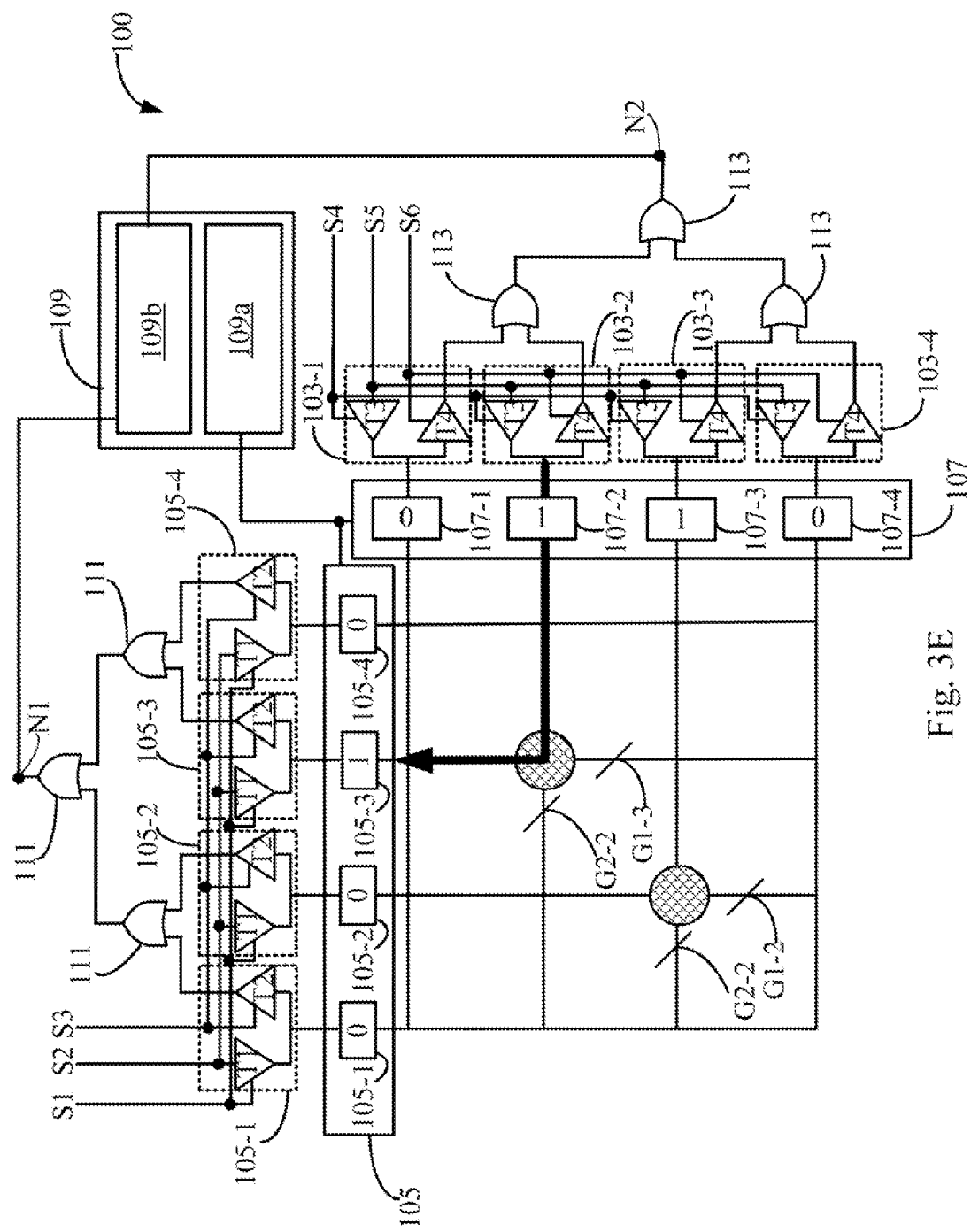

For instance, as shown in FIG. 3E, the touch determining unit 109a provides the voltage level temporarily stored in the second buffer unit 107-2 to the second scan line G2-2, and the first scan sensing module 101 senses voltage levels of the first scan lines G1-1~G1-4. Under such circumstance, a voltage level of the second scan line G2-2 is transmitted to the first scan line G1-3 so the first buffer unit 105-3 can store a voltage level of the first scan line G1-3.

Subsequently, step S309 is performed: a first touch coordinate is determined by the touch determining unit according to the voltage level of the one of the second scan lines temporarily stored and the voltage level of the one of the first scan lines temporarily stored.

Figure 3F:
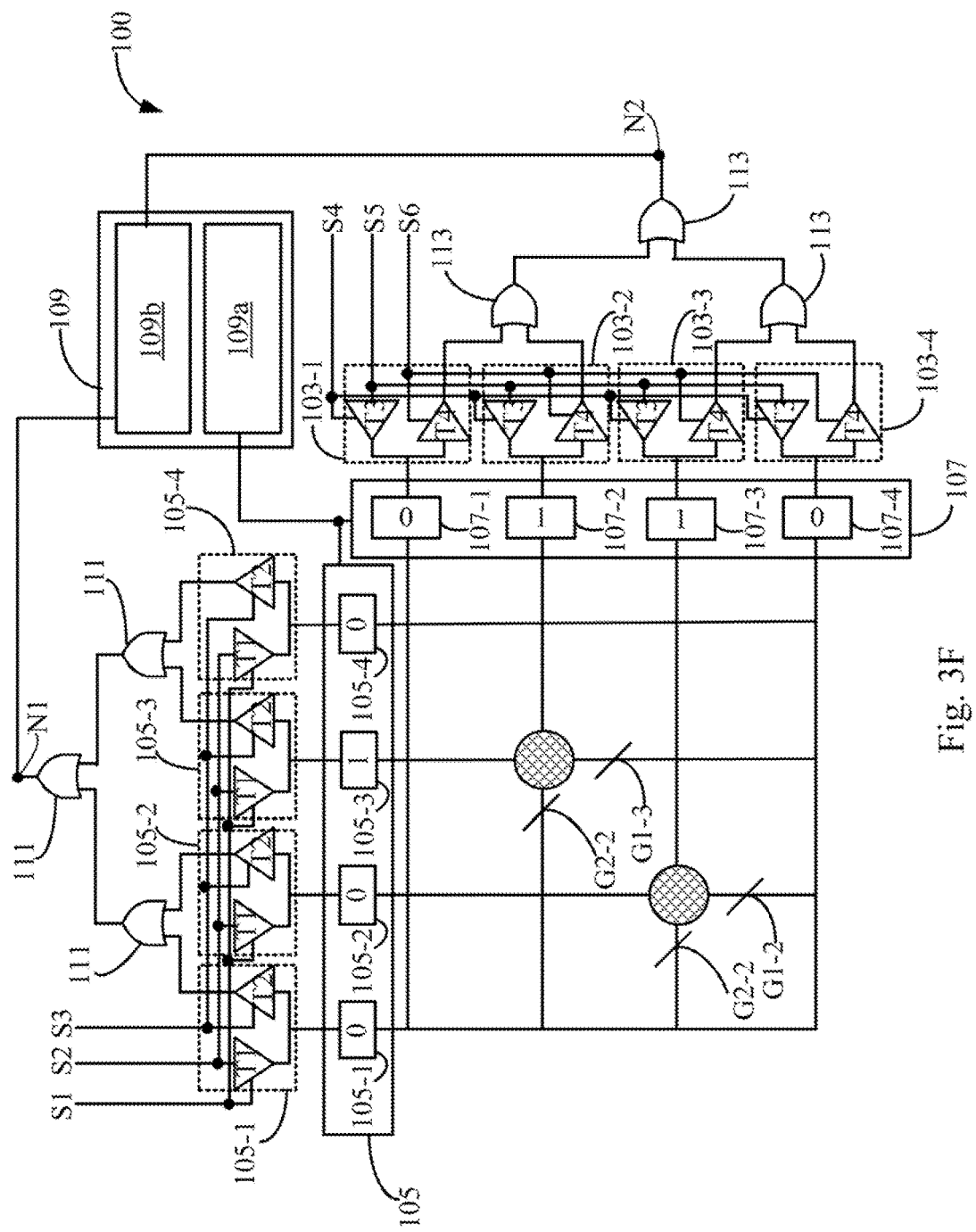

For instance, as shown in FIG. 3F, the touch determining unit 109a determines the first touch coordinate of the touch input incident according to the voltage level of the first scan line G1-3 temporarily stored in the first buffer unit 105-3 and the voltage level of the second scan line G2-2 temporarily stored in the second buffer unit 107-2.

Subsequently, step S311 is performed: the first touch coordinate is stored by the touch determining unit. For instance, the control module 109 can temporarily store the first touch coordinate.

Subsequently, step S313 is performed: the voltage level temporarily stored to a scan line subsequent to the one of the second scan lines is provided by the second scan sensing module, a voltage level of one of the first scan lines is sensed by the first scan sensing module, and the voltage level of the one of the first scan lines is temporarily stored by the first buffer module.

Figure 3G:
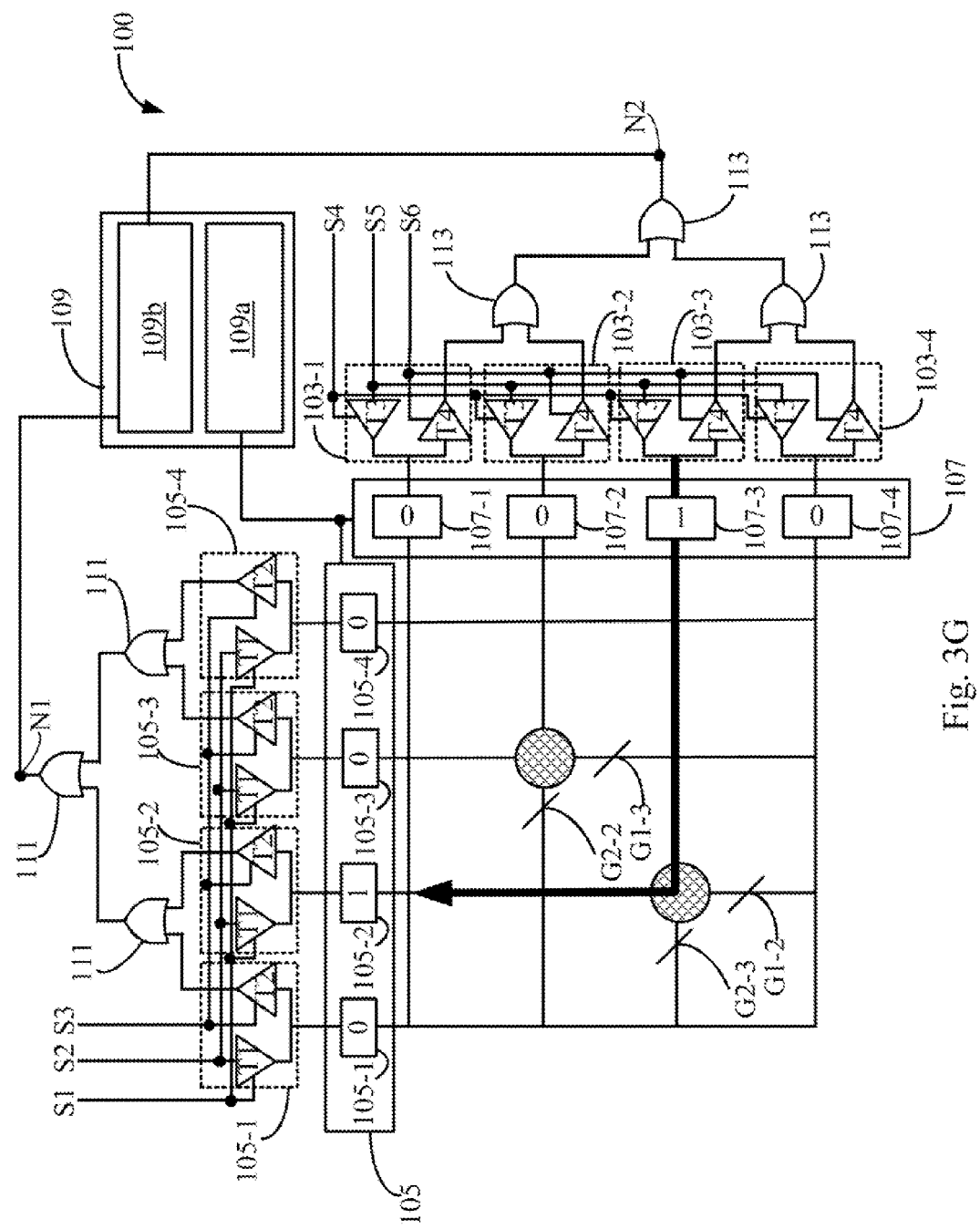

For instance, as shown in FIG. 3G, the touch determining unit 109a provides the voltage level temporarily stored in the second buffer unit 107-3 to the second scan line G2-3, and senses the voltage levels of the first scan lines G1-1~G1-4. Since the touch determining unit 109 has already provided the temporarily stored voltage level to the second scan line G2-2, the touch determining unit 109a provides the voltage level temporarily stored in the second buffer unit 107-3 to the second scan line G2-3 which is the scan line subsequent to the second scan line G2-2. The touch determining unit 109a then senses the voltage levels of the first scan lines G1-1~G1-4 via the first buffer module 105, and the voltage level of the second scan line G2-3 is sensed. Therefore, the first buffer unit 105-2 of the first buffer module 105 temporarily stores the voltage level of the first scan line G1-2.

Subsequently, step S315 is performed: a second touch coordinate is determined by the touch determining unit according to the voltage level of the scan line subsequent to the one of the second scan lines temporarily stored and the voltage level of the one of the first scan lines temporarily stored.

Figure 3H:
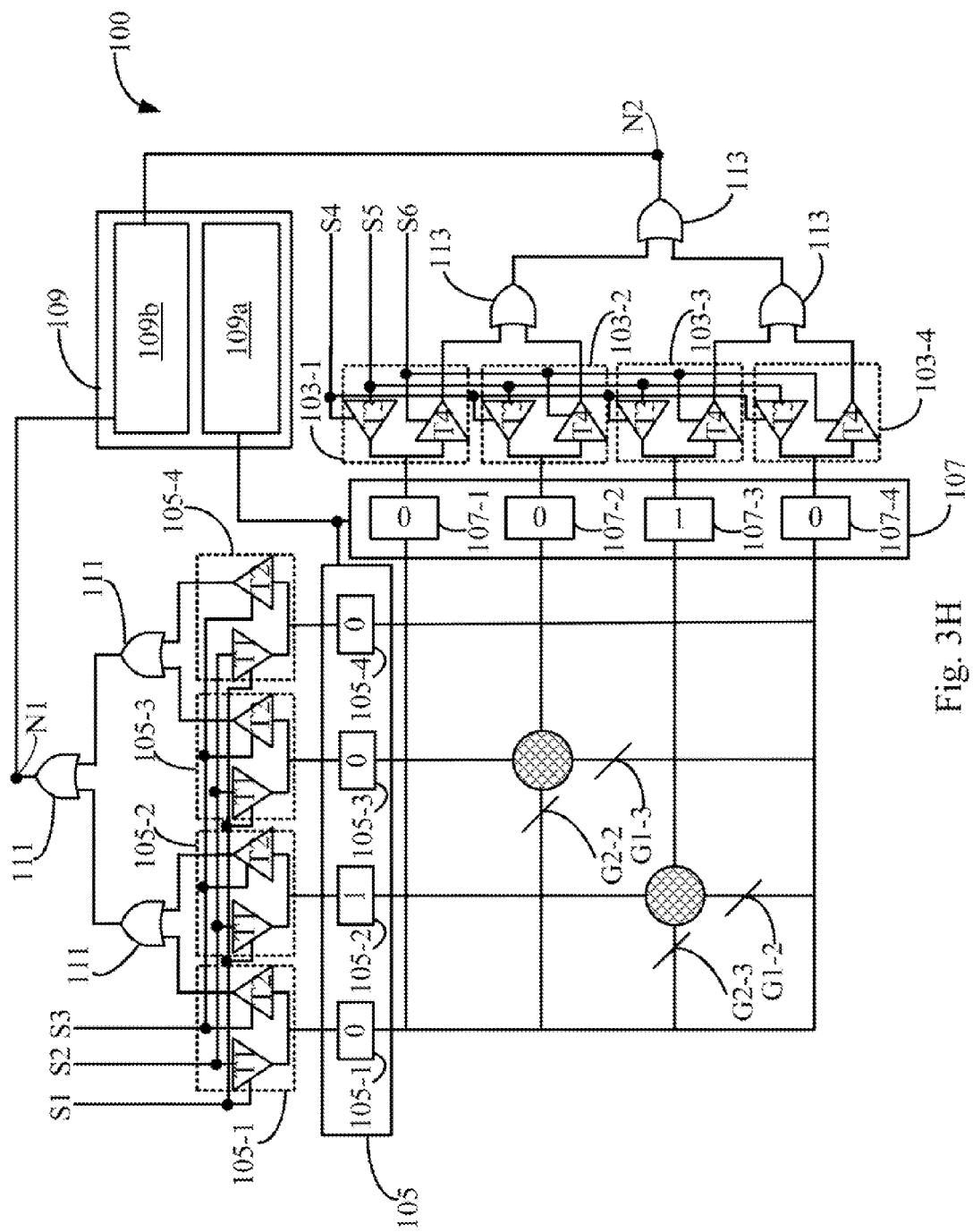

For instance, as shown in FIG. 3H, the touch determining unit 109a determines the second touch coordinate of the touch input incident according to the voltage level of the first scan G1-2 line temporarily stored in the first buffer unit 105-2 and the voltage level of the second scan line G2-3 temporarily stored in the second buffer unit 107-3.

Lastly, step S317 is performed: the second touch coordinate is stored by the touch determining unit. For instance, the control module 109 can be utilized to store the second touch coordinate. Hence, the touch determining unit 109a can determine a first touch coordinate and a second touch coordinate of the touch input incident. In other words, the touch panel circuit and the operation method thereof can support multi-touch, and is able to precisely determine several touch coordinates of the touch input incident.

In another embodiment, the operation method 300 can further comprise the following step: the second scan sensing module providing the voltage level temporarily stored to the one of the second scan lines, and the first scan sensing module sensing a voltage level of a scan line subsequent to the one of the first scan lines.

For instance, as shown in FIG. 3H, the touch determining unit 109a determines the second touch coordinate and then stores the second touch coordinate. The touch determining unit 109a then still provides the temporarily stored voltage level to the second scan line G2-3, and senses the first scan line G1-1 which is subsequent to the first scan line G1-3. More specifically, the touch determining unit 109a has already sensed the first scan line G1-2, so the touch determining unit 109a starts sensing from the first scan line G1-1. However since the first scan line G1-1 is not coupled to any second scan lines G2-3, the first buffer unit 105-1 does not temporarily store the voltage level of the first scan line G1-1.

The number of the first scan line, second scan line, the first buffer unit, the second buffer unit, the first logic gate, the second logic gate, the third logic gate, the fourth logic gate and the OR gate are merely for exemplary purposes and are not meant to limit the scope of the present invention.

According to above embodiments, the touch panel circuit and the operation method thereof of the present invention utilizes combinations of basic logic gates and relative circuit designs to control the touch panel in a fully digitalized manner, without requiring extra circuits to convert analog signals to digital signals. Hence the cost can be lowered. Further, the touch panel circuit and the operation method thereof of the present invention can support multi-touch input, and can be applied to flexible touch panels or large-size touch panels. The touch panel circuit and the operation method thereof of the present invention can quickly determine an occurrence of a touch input incident and can accurately determine the touch coordinate of the touch input incident, via circuit designs of the logic gates.

What is claimed is:

1. A touch panel circuit, comprising:
    a plurality of first scan lines;
    a plurality of second scan lines, wherein the first scan lines perpendicularly intersect with the second scan lines respectively; and
    a first scan sensing module, comprising a plurality of first scan sensing units, each of the first scan sensing units corresponding to one of the first scan lines respectively, the each of the first scan sensing units comprising:
        a first logic gate, comprising a first input terminal, a first output terminal and a first control terminal, wherein the first output terminal is coupled to the one of the first scan lines; and
        a second logic gate, comprising a second input terminal, a second output terminal and a second control terminal, wherein the second input terminal is coupled to the one of the first scan lines;
    wherein either the first logic gate or the second logic gate is turned on according to a first control signal, so that the first input terminal is connected to the first output terminal and the one of the first scan lines, or the second input terminal and the one of the first scan lines are connected to the second output terminal;
    second scan sensing module, comprising a plurality of second scan sensing units, each of the second sensing units corresponding to one of the second scan lines respectively, each of the second scan sensing units comprising;
        a third logic gate, comprising a third input terminal, a third output terminal and a third control terminal, wherein the third output terminal is coupled to the one of the second scan lines; and
        a fourth logic gate, comprising a fourth input terminal, a fourth output terminal and a fourth control terminal, wherein the fourth input terminal is coupled to the one of the second scan lines;

wherein either the third logic gate or the fourth logic gate is turned on according to a second control signal, so that the third input terminal is connected to the third output terminal and the one of the second scan lines or the fourth input terminal and the one of the second scan lines are connected to the fourth output terminal;

wherein the first logic gates and the fourth logic gates are turned on simultaneously according to the first control signal and the second control signal respectively, while the second logic gates and the third logic gates are turned off simultaneously according to the first control signal and the second control signal respectively, or the first logic gates and the fourth logic gates are turned off simultaneously according to the first control signal and the second control signal respectively, while the second logic gates and the third logic gates are turned on simultaneously according to the first control signal and the second control signal respectively.

2. The touch panel circuit of claim 1, further comprising a touch determining unit, coupled to the fourth input terminals of the fourth logic gates, wherein when the first logic gates and the fourth logic gates are turned on simultaneously according to the first control signal and the second control signal respectively, the first output terminals of the first logic gates provide a plurality of first voltage reference signals to the first scan lines respectively, the touch determining unit senses voltage levels of the second scan lines via the fourth logic gates respectively.

3. The touch panel circuit of claim 2, wherein the touch determining unit is further coupled to the second input terminals of the second logic gates, when the second logic gates and the third logic gates are turned on simultaneously according to the first control signal and second control signal respectively, the third output terminal of the third logic gates provide a plurality of second voltage reference signals to the second scan lines respectively, the touch determining unit senses voltage levels of the first scan lines via the second logic gates respectively.

4. The touch panel circuit of claim 3, further comprising:

a first buffer module, comprising a plurality of first buffer units, wherein the first buffer units are coupled to the second output terminals of the second logic gates respectively and the touch determining unit, the first buffer units temporarily store the voltage levels of the first scan lines; and a second buffer module, comprising a plurality of second buffer units, wherein the second buffer units are coupled to the fourth output terminals of the fourth logic gates respectively and the touch determining unit, the second buffer units temporarily store voltage levels of the second scan lines;

wherein the touch determining unit determines and temporarily stores a touch input incident according to the voltage levels of the first scan lines and the voltage levels of the second scan lines, the touch input incident comprises one or a plurality of touch coordinates.

5. The touch panel circuit of claim 4, further comprising a plurality of second OR gates, wherein the second OR gates form a second OR-gate binary tree according to the binary tree structure, the second OR-gate binary tree comprises a plurality of second input nodes and a second output node, and the second input nodes correspond to the fourth output terminals of the fourth logic gates respectively.

6. The touch panel circuit of claim 3, further comprising a plurality of first OR gates, wherein the first OR gates form a first OR-gate binary tree according to a binary tree structure, the first OR-gate binary tree comprises a plurality of first input nodes and a first output node, and the first input nodes correspond to the second output terminals of the second logic gates respectively.

7. The touch panel circuit of claim 6, further comprising a touch detecting unit, coupled to the first output node and the second output node, the touch detecting unit determining whether the touch input incident is occurred according to the first output node and the second output node.

8. An operation method of a touch panel circuit, the touch panel circuit comprising a plurality of first scan lines, a plurality of second scan lines, a first scan sensing module, a second scan sensing module, a first buffer module, a second buffer module and a touch determining unit, the operation method comprising following steps:

providing a plurality of first voltage reference signals by the first scan sensing module;

sensing voltage levels of the second scan lines by the second scan sensing module;

temporarily storing voltage levels of the second scan lines by the second buffer module when one of the second scan lines is of the first voltage reference signal;

providing a plurality of second voltage reference signals by the second scan sensing module;

sensing voltage levels of the first scan lines by the first scan sensing module;

temporarily storing the voltage levels of the first scan lines by the first buffer module when one of the first scan lines is of the second voltage reference signal; and determining a touch input incident by the touch determining unit according to the voltage levels of the first scan lines temporarily stored and the voltage levels of the second scan lines temporarily stored.

9. The operation method of claim 8, wherein the step of providing the first voltage reference signals by the first scan sensing module comprises:

receiving a first control signal and providing the first voltage reference signals by the first scan sensing module according to the first control signal.

10. The operation method of claim 8, wherein the step of providing the second voltage reference signals by the second scan sensing module comprises:

receiving a second control signal and providing the second voltage reference signals by the second scan sensing module according to the second control signal.

11. The operation method of claim 8, wherein the touch input indent comprises a touch coordinate.

12. The operation method of claim 8, wherein the touch panel circuit further comprises a touch detecting unit and the operation method further comprises the step of:

determining whether the touch input incident is occurred by the touch detecting unit according to a first output node and a second output node.

13. An operation method of a touch panel circuit, the touch panel circuit comprising a plurality of first scan lines, a plurality of second scan lines, a first scan sensing module, a second scan sensing module, a first buffer module, a second buffer module and a touch determining unit, the operation method comprising following steps:

providing a plurality of first voltage reference signals by the first scan sensing module;

sensing voltage levels of the second scan lines by the second scan sensing module;

temporarily storing a voltage level of one of the second scan lines by the second buffer module when the one of the second scan lines is of the first voltage reference signal;

providing the voltage level temporarily stored to the one of the second scan lines by the second scan sensing module, sensing a voltage level of one of the first scan lines by the first scan sensing module, and temporarily storing the voltage level of the one of the first scan lines by the first buffer module;

determining a first touch coordinate by the touch determining unit according to the voltage level of the one of the second scan lines temporarily stored and the voltage level of the one of the first scan lines temporarily stored; and storing the first touch coordinate by the touch determining unit.

14. The operation method of claim 13, further comprising the steps of:

providing the voltage level temporarily stored to a scan line subsequent to the one of the second scan lines by the second scan sensing module, sensing a voltage level of one of the first scan lines by the first scan sensing module, and temporarily storing the voltage level of the one of the first scan lines by the first buffer module;

determining a second touch coordinate by the touch determining unit according to the voltage level of the scan line subsequent to the one of the second scan lines temporarily stored and the voltage level of the one of the first scan lines temporarily stored; and storing the second touch coordinate by the touch determining unit.

15. The operation method of claim 13, further comprising the step of:

providing the voltage level temporarily stored to the one of the second scan lines by the second scan sensing module, and sensing a voltage level of a scan line subsequent to the one of the second scan lines by the first scan sensing module.

* * * * *